US006370167B1

(12) United States Patent
Donati et al.

(10) Patent No.: US 6,370,167 B1
(45) Date of Patent: Apr. 9, 2002

(54) DOUBLE-PASSAGE ACOUSTO-OPTICAL DEVICE AND LASER

(75) Inventors: Stefano Donati, Verghera; Salvatore Morasca, Como; Steffen Schmid, Monza, all of (IT)

(73) Assignee: Corning O.T.I. s.P.a., Milan (IT)

( * ) Notice: Subject to any disclaimer, the term of this patent is extended or adjusted under 35 U.S.C. 154(b) by 0 days.

(21) Appl. No.: 09/406,922

(22) Filed: Sep. 28, 1999

Related U.S. Application Data

(60) Provisional application No. 60/103,186, filed on Oct. 5, 1998.

(30) Foreign Application Priority Data

Sep. 29, 1998 (EP) .............................. 98118377

(51) Int. Cl.[7] .......................... H01S 3/10; H01S 3/117; G02F 1/33
(52) U.S. Cl. ........................... 372/20; 372/13; 359/308
(58) Field of Search .................. 372/20, 13, 9, 372/105; 385/11, 1, 4, 28; 359/308, 305, 309, 314

(56) References Cited

U.S. PATENT DOCUMENTS

| 5,002,349 A | 3/1991 | Cheung et al. ................. 385/1 |
| 5,452,314 A | 9/1995 | Aronson ....................... 372/20 |
| 5,611,004 A | 3/1997 | Chang et al. ................. 385/11 |
| 5,850,491 A | 12/1998 | Morasca et al. ............... 385/7 |
| 5,850,492 A | 12/1998 | Morasca et al. ............... 385/11 |

FOREIGN PATENT DOCUMENTS

| WO | WO 98/11463 | 3/1998 | ............ G02B/6/28 |
| WO | WO 99/06876 | 2/1999 | ............ G02F/1/125 |

OTHER PUBLICATIONS

D.A. Smith et al.; "Technology and Applications of the Integrated Acousto–Optic Filter", Melecon '96. 8th Mediterranean Electrotechnical Conference. Industrial Applications in Power Systems, Computer Science and Telecommunications. Proceeding, vol. 1, pp. 100–107, (1996) May.

S.H. Yun et al.; "All–Fiber Acoustooptic Filter With Low–Polarization Sensitivity and No Frequency Shift", IEEE Photonics Technology Letters, vol. 9, No. 4, pp. 461–463, (1997) Apr.

D.O. Culverhouse et al.;"Low–Loss All–Fiber Acousto–Optic Tunable Filter", Optics Letter, vol. 22, No. 2, pp. 96–98, (1997) Jan.

D.A. Smith et al.; "Acoustically Tuned Erbium–Doped Fiber Ring Laser", Optics Letters, vol. 16, No., 6., pp. 387–389, (1991) Mar.

I. Baumann et al.; "Acoustically Tunable Ti:Er:LiNbO$_3$–Waveguide Laser", ECOC '94, vol. 4, pp. 99–102, (1994) (No month available).

*Primary Examiner*—Quyen Leung

(57) ABSTRACT

A double-passage acousto-optical device including an acousto-optical switch having a first polarization conversion region connected between first input and output ports, and a second conversion region connected between second input and output ports; and an optical combination connected between the first output port and the second input port via optical fibers and including an optical isolating element. The double-passage acousto-optical device may alternately include an acousto-optical switch including a single polarization conversion region connected between first input and output ports and also connected between second input and output ports. A bandpass filter, a notch filter, and add/drop and a tunable laser generator may be formed using the acousto-optical device.

36 Claims, 30 Drawing Sheets

DOUBLE-PASSAGE ACOUSTO-OPTICAL DEVICE AND LASER

This appln claims benefit of Prov. No. 60/103,186 filed Oct. 5, 1998.

BACKGROUND OF THE INVENTION

The present invention relates generally to a double-passage acousto-optical device, that is, an acousto-optical device through which light passes twice, and specifically to various optical filters, wavelength add/drop devices, and lasers that are constructed using the double-passage optical device.

It is known to use optical fibers to send optical information-carrying signals for long-distance communication.

Optical telecommunication systems are known that use wavelength division multiplexing (WDM) transmission. In these systems several channels, i.e. a number of independent transmission signals, are sent over the same line by means of wavelength division multiplexing. The transmitted channels may be either digital or analog and are distinguishable because each of them is associated with a specific wavelength.

The Applicant has observed that known WDM communication systems are limited as concerns the number of channels, i.e. the independent wavelengths that can be used for transmission within the wavelength band available for signal transmission and amplification.

In order to combine and separate signals with different wavelengths—to combine the signals at the transmission station, for example, to drop some toward receivers located at intermediate nodes of the line or to introduce others at intermediate nodes or to send them to separate receivers at the receiving station—adjacent channels (in wavelength terms) must be separated by more than a minimum predetermined value.

Said minimum value depends on the characteristics of the components employed in the system, such as the spectral characteristics of the wavelength selective components (e.g. bandwidth, center-band attenuation, figure of merit) and the wavelength stability (thermal and temporal) of the selective components themselves and of optical signal sources.

In particular, the Applicant has observed that the spectral selectivity of currently available wavelength selective components may greatly limit the possibility of adding and dropping signals in multichannel transmission systems, particularly when there are signals with closely spaced wavelengths, e.g. separated by less than 2 nm.

In optical filtering, either in optical communication systems or for other purposes, double-stage optical filters are advantageous, because their filtering performance is increased compared to a single-stage filter having the same characteristics. Acousto-optical filters are known that provide for the interaction between light signals, propagated in waveguides formed on a substrate of birefringent and photoelastic material, and sound waves propagated on the surface of the substrate. The sound waves are generated by suitable transducers and are initially supplied by radio frequency signals.

The interaction between a polarized optical signal and a sound wave produces a polarization conversion of the signal, in other words, a change of the polarization from its transverse electric TE component to its transverse magnetic TM component, which are orthogonal to each other, and vice versa. Following this interaction with the sound wave, the polarization components undergo not only the conversion to the corresponding orthogonal components, but also a frequency shift whose absolute value is equal to the frequency of the interacting sound wave (and therefore equal to that of the applied radio frequency signal). The sign of the frequency shift is a function of the state of polarization and of the direction of propagation of the sound wave with respect to the optical wave.

In addition to their use as pure filters, acousto-optic devices have also been used as tuning devices for lasers. To Applicants' knowledge, however, conventional acousto-optic devices used as filters or tuners for lasers have generally employed either a single-stage acousto-optic substrate using a single pass of light through the device or have employed multiple stages of cascaded acousto-optic filters that are constructed on separate physical substrates.

For example, EP Application 97113188.3 describes an acousto-optic device including a substrate of a material capable of propagating a surface acoustic wave along a portion of the surface of the substrate, a transducer for generating the surface acoustic wave, an optical waveguide formed in a substrate, and an acoustic absorber surrounding the portion of the substrate.

EP 0814364 A1 describes a double-stage acousto-optical waveguide device. FIG. 12 shows a switch, or add/drop node comprising, in addition to a third polarization conversion stage 303, a fourth polarization conversion stage 403. The fourth polarization conversion stage 403 is connected to an input polarization splitter 404 and to an output polarization splitter 405. In turn the splitter 405 is connected to the polarization splitter 204 by means of the connecting branch 210 and to the lateral waveguard 255. The ports 19, 20, 21 and 22 are connected to the line. The polarization splitter 404 is connected to input ports 25 and 26 through which the signals to be added or subtracted are introduced and signals to be added or subtracted are also introduced through the ports 23 and 24.

U.S. Pat. No. 5,611,004 discloses a polarization independent acousto-optical tunable filter (AOTF). The patent describes in its FIG. 6 an embodiment where two stages of signal filtering are realized with only one transducer 43 on the substrate 31. Two stages of filtering are realized by passing the incoming beam of light through the AOTF a first time, reflecting the beam of light off of a mirror 67 and then passing the beam of light through the same AOTF a second time. A band pass filtered representation of the original beam of light is obtained at a circulator output 71 of an optical circulator 69 located at the input of the embodiment.

U.S. Pat. No. 5,452,314 describes an acousto-optic tunable filter with a pair of electrodes on opposite sides of the waveguide. The patent discloses the use of a voltage source in which an applied electric field controls the birefringence of the filter, and a tunable laser incorporating such an acousto-optic tunable filter. Suitably adjusting the potential applied by the voltage source results in suppression of sidelobes, correction of asymmetric sidelobes, and compensation for physical variations in the waveguide.

U.S. Pat. No. 5,002,349 and EP 805372 describe single converter acousto-optic tunable filters. The '349 patent discloses an acousto-optical converter that allows multiple stages of such converters so as to provide for two-stage zero-frequency shifted converters and filters, lasers using an acousto-optic filter as a tuning element, polarization-independent converters, and wavelength-division-multiplexing routing switches. "Acoustically tuned erbium-doped fiber ring laser" by D. A. Smith et al., *Optics Letters*, vol. 16, no. 6, Mar. 15, 1991, describes a continuously tunable laser that uses an acousto-optic filter to achieve a broad tuning range. "Acoustically tunable Ti:Er:LiNbO-Waveguide Laser" by I. Baumann et al., ECOC '94, vol. 4, pp. 99–102 describes a waveguide laser comprising a double-stage wavelength filter utilized as a narrow-band tunable optical amplifier.

WO 98/11463 discloses, with reference to its FIG. 7, an embodiment that can alleviate the polarization sensitivity of a null coupler acousto-optic tunable filter by simultaneously applying two acoustic waves. The null coupler is made from two optical fibers with diameters that are mismatched to the extent that the resultant coupler gives an extremely small passive coupling efficiency. The coupler is made by pre-tapering one of the two identical single-mode fibers along a short length before both fibers are fused and elongated together to form the coupler.

In the device of WO 98/11463, input light in the fiber that was not pretapered excites only the fundamental mode in the narrow waist of the coupler. Light in the other fiber excites only the second order mode. When the acoustic wavelength matches the optical beat length of the two modes in the waist, resonant coupling takes place between them. After light enters the device at port 1, both polarization components are coupled to port 2 but undergo different upshifts in frequency. After propagating through a loop of a polarization independent isolator, light of each polarization re-enters the coupler and is coupled a second time, exiting through port 4 with a frequency downshift.

In contrast, devices that use polarization converters as opposed to modal converters as in WO 98/11463 use two separate waveguides with birefringent material rather than fused fiber couplers. In the fiber coupler arrangement, the optical signal passes through only a single waveguide and conversion region. The modal coupling device in WO 98/11463 also faces a high polarization sensitivity that requires two separate radio frequencies to overcome.

Applicants have discovered that double-stage acousto-optic filters having polarization converters as opposed to modal converters provide a lower than desired level of filtering for optical signals due to the physical layout of the configuration. In particular, Applicants have observed that in conventional double-stage optical filters, it may be difficult to match the filter characteristics of the two stages, particularly when the stages are located physically apart. Similarly, Applicants have discovered that matching the temperatures of the two stages may present difficulties as well. Further, two separate stages may require separate driver frequencies for their respective acousto-optical devices, which may be mismatched, and therefore must be separately calibrated.

SUMMARY OF THE INVENTION

Applicants have noticed that the amount of filtering attainable with an acousto-optic filter depends significantly on the configuration chosen for the filter and its affiliated components. Particularly, Applicants have identified that a single pass and single stage acousto-optic filter provides insufficient filtering performance. As well, a two-stage filter integrated on a single substrate introduces numerous manufacturing challenges and risks in properly balancing the temperature and stability between the two stages.

Applicants have, therefore, developed an inventive acousto-optic filter and laser using the filter for double-pass and single stage operation. The filter of the present invention enables single temperature control (no temperature difference between two stages), a single radio frequency control, reduction to half of the electro-acoustic transducers and of the radio-frequency power with respect to a double-stage device, less overall size, narrower bandwidth, and suitability for use as a filter with notch output and as an add/drop device. As well, this filter provides the capability of eliminating frequency shift and wavelength shift, if necessary, and performing an effective polarization independent device, and the capability of eliminating frequency shift even when the radio frequency on the two converters is different.

In one aspect, a double-passage acousto-optical device includes an acousto-optical switch including first and second polarization conversion regions both coupled between first, second, third, and fourth optical ports, together with an optical combination coupled between the second and third optical ports that includes an optical isolating element. Preferably, a first optical splitter is positioned between the first and fourth optical ports and the first and second polarization conversion regions, where the first optical splitter has cross and bar transmission respectively for orthogonal polarization components of received light. Also, a second optical splitter is preferably positioned between the second and third optical ports and the first and second polarization conversion regions, where the second optical splitter has cross and bar transmission respectively for orthogonal polarization components of received light.

More preferably, the double-passage acousto-optical device consistent with the present invention includes an upper transducer within the acousto-optical switch acoustically coupled to the first polarization conversion region and coupled to an RF source, where the upper transducer generates a first acoustic wave in the first polarization conversion region that has a characteristic frequency determined by the RF source. As well, the double-passage acousto-optical device further includes a lower transducer within the acousto-optical switch acoustically coupled to the second polarization conversion region and coupled to the RF source, where the lower transducer generates a second acoustic wave in the second polarization conversion region that has the characteristic frequency with a propagation direction opposite to a propagation direction of the first acoustic wave.

In another aspect, a tunable laser generator that uses an acousto-optical device includes an acousto-optical switch having first and second polarization converters coupled between first, second, third, and fourth optical ports, a first optical half-ring coupled between the first and fourth optical ports and including an optical amplifier, and a second optical half-ring coupled between the second and third optical ports and including an optical isolating element. The laser includes a laser output coupler positioned within the first optical half-ring. Preferably, the tunable laser generator has an optical isolating element in the first half-ring. Preferably, one or both of the first half-ring and the second half-ring consist of polarization-maintaining elements. Alternatively, one or both of the first half-ring and the second half-ring includes a polarization controller. Preferably an RF generator is coupled to the first and second polarization converters for tuning the laser generator.

Preferably, the tunable laser generator further comprises a first optical splitter positioned between the first and fourth optical ports and the first and second polarization converters, the first optical splitter having cross and bar transmission respectively for orthogonal polarization components of received light. Advantageously it further comprises a second optical splitter positioned between the second and third optical ports and the first and second polarization converters, the second optical splitter having cross and bar transmission respectively for orthogonal polarization components of received light.

Preferably, the tunable laser generator further comprises an upper transducer within the acousto-optical switch acoustically coupled to the first polarization converter and coupled to an RF source, the upper transducer generating a first acoustic wave in the first polarization converter and having a characteristic frequency determined by the RF source. In an embodiment, it further comprises a lower transducer within the acousto-optical switch acoustically coupled to the second polarization converter and coupled to the RF source, the lower transducer generating a second acoustic wave in the second polarization converter and having the characteristic frequency with a propagation direction opposite to a propagation direction of the first acoustic wave. According to a different, alternative, embodiment the first and second polarization converters are positioned in sufficient proximity that the first acoustic wave travels in both the first and second polarization converters.

In another aspect of the present invention, a method of filtering an optical frequency using an acousto-optical device includes the steps of providing at least one acousto-optical switch including first and second polarization conversion regions coupled between first, second, third, and fourth optical ports; injecting an input optical signal having a plurality of wavelengths into the first optical port; feeding-back an intermediate optical signal including a subset of the plurality of wavelengths from the second optical port to the third optical port via an optical isolating element; and extracting an output optical signal including the subset of the plurality of wavelengths from the fourth optical port. Preferably, the method further includes the step of extracting a remainder of the plurality of wavelengths from the second optical port via the optical isolating element, wherein the optical isolating element is an optical circulator having at least three ports. Alternatively, the method further includes the step of inputting additional wavelengths to the device via the optical isolating element. Alternatively, the method can further comprise the step of controlling the polarization of the intermediate optical signal, or the step of maintaining the polarization of the intermediate optical signal using polarization-maintaining components.

More preferably, the method consistent with the present invention includes the steps of splitting the input optical signal into TE and TM initial components within a first optical splitter on the switch; passing the TE initial component to the first polarization conversion region; passing the TM initial component to the second polarization conversion region; orthogonally converting the TE initial component of the input optical signal having a selected frequency to a TM intermediate component in the first polarization conversion region; and orthogonally converting the TM initial component of the input optical signal having the selected frequency to a TE intermediate component in the second polarization conversion region. Alternatively, the method further includes the step of combining the TE and TM intermediate components into the intermediate optical signal or combining the TE and TM initial components into the intermediate optical signal.

Also preferably, the method includes, after the feeding-back step, the steps of splitting the intermediate optical signal into TE and TM feedback components within a second optical splitter on the switch; passing the TE feedback component to the first polarization conversion region; passing the TM feedback component to the second polarization conversion region; orthogonally converting the TE feedback component having the selected frequency to a TM final component in the first polarization conversion region; and orthogonally converting the TM feedback component having the selected frequency to a TE final component in the second polarization conversion region. Alternatively, the method further includes the step of combining the TE and TM final components into the output optical signal or combining the TE and TM feedback components into the output optical signal.

Applicants note that in the double-passage acousto-optical device according to the present invention, the filter characteristics are always matched and aligned; there is no need for temperature matching; and only a single driver frequency is needed for the acousto-optical filter therein.

It is to be understood that both the foregoing general description and the following detailed description are exemplary and explanatory only and are not restrictive of the invention, as claimed. The following description, as well as the practice of the invention, set forth and suggest additional advantages and purposes of this invention.

BRIEF DESCRIPTION OF THE DRAWINGS

The accompanying drawings, which are incorporated in and constitute a part of this specification, illustrate embodiments of the invention, and together with the description, explain the advantages and principles of the invention.

DETAILED DESCRIPTION OF THE PREFERRED EMBODIMENTS

Figure 1:
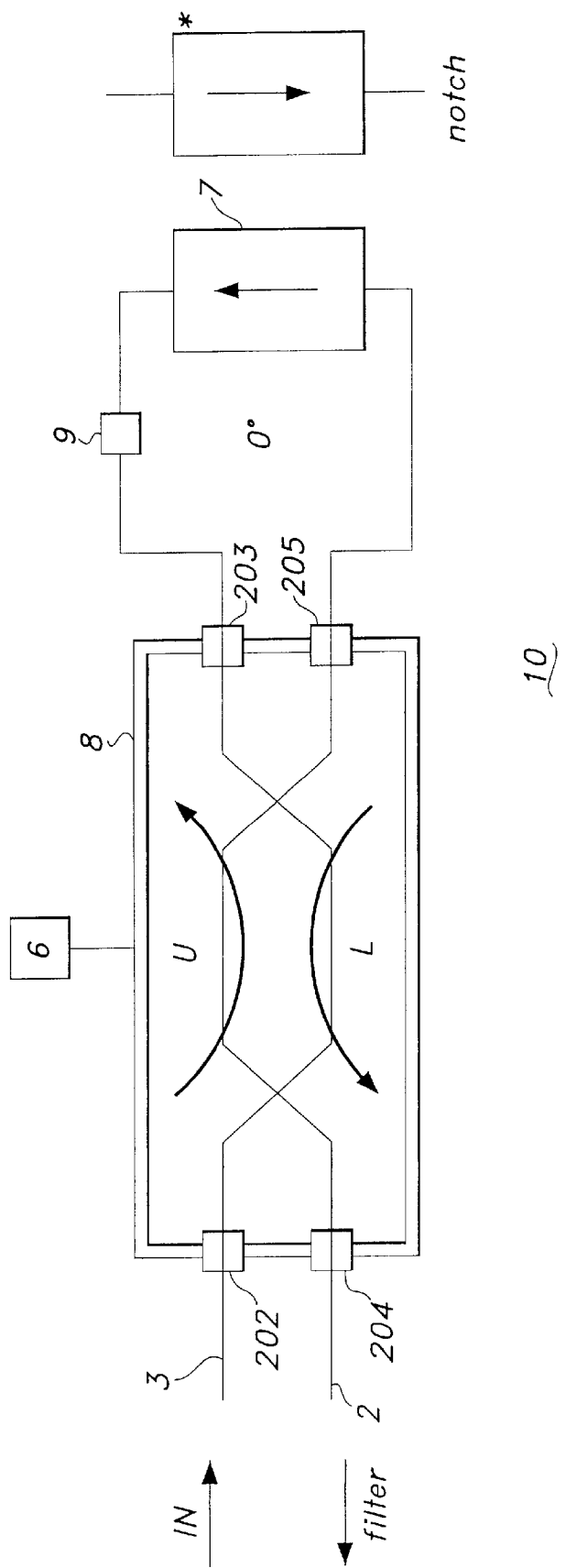
FIG. 1 shows schematically a bandpass filter according to an embodiment of the invention.

Reference will now be made to various embodiments according to this invention, examples of which are shown in the accompanying drawings and will be obvious from the description of the invention. In the drawings, the same reference numbers represent the same or similar elements in the different drawings whenever possible.

As generally illustrated in FIG. 1, a double-passage acousto-optical device consistent with the present invention includes an acousto-optical switch having a first polarization conversion portion connected between first input and output ports, and a second polarization conversion portion connected between second input and output ports; and an optical combination connected between the first output port and the second input port and including an optical isolating element.

The double passage acousto-optical device disclosed in the following is adapted for use in an optical communication system, in particular a WDM optical transmission system comprising a plurality of optical sources for generating optical signals at different wavelengths, a combiner for sending the plurality of signals to a common optical path comprising an optical fiber line and optical receivers for the signals. The double passage acousto-optical device can be used in the above optical transmission system, for example, to separate one or more than one channel from the remaining transmission channels and/or from noise (filtering), to separate signals having different wavelength to different optical paths (drop) or to add to the optical fiber line optical signals at one or more selected wavelength (add).

In reference to FIG. 1, an acousto-optical device generally referred to as 10, comprises an input optical fiber 3, by which optical radiation is introduced from an external source (not shown), connected to a first input port 202 of an acousto-optical switch 8. Switch 8 is connected to a radio-frequency generator 6. A first output port 205 of the acousto-optical switch 8 is connected to a optical isolator 7, whose output is optically connected or coupled to a polarization controller 9. An output of the polarization controller 9 is coupled to a second input port 203 of acousto-optical switch 8. A second output port 204 is coupled to an output fiber 2 of acousto-optical device 10. By the term "coupled," it is meant that two physical devices are joined by a common optical path and possibly, although not necessarily, physically adhered. Applicants use the terms "coupled" and "connected" interchangeably in describing the invention, and those of skill in the art will appreciate that the various components identified herein need not be physically attached to each other to provide the optical coupling that assists in achieving the beneficial results of the invention.

The optical fibers interconnecting the various components described may be monomode optical fibers of type 9/125 (where 9 represents the diameter of the core, and 125 represents the diameter of the cladding of the fiber in microns). Such an exemplary fiber may have its core doped with germanium and have a numerical aperture (NA) of about 0.13. Other well-known transmission fibers would suffice as well to transfer optical signals to acousto-optical device 10.

The polarization controller 9 comprises a plurality of optical fibers disposed in succession and supported in such a way that they can be orientated with respect to a common axis of alignment to provide the desired polarization control. Devices of the type indicated are marketed by GEC MARCONI MATERIALS TECHNOLOGY Ltd, Caswell, Towcester, Northants, NN12 8EQ (United Kingdom). Polarization controllers suitable to be used in the present invention are the HP-11896 and the HP-8169. However, those skilled in the art will appreciate that other controllers equivalent to those described for adjusting the optical polarization may alternatively be used.

The optical isolator 7 is preferably of a type independent of the polarization of the transmission signal passing through optical switch 8 and having an isolation of more than 35 dB and reflectivity of less than −50 dB. In particular, a sufficient isolator for device 7 is a Newport ISO 15FTB. However, those skilled in the art will appreciate that other isolators equivalent to those described may alternatively be used. The isolator 7 can be used to set the direction of travel of the radiation in acousto-optical device 10.

The radio-frequency generator 6 driving the acousto-optical filter has frequency that can be varied, for example, from 160 MHz to 180 MHz, for the selection of the wavelength of the output optical radiation (for example, 1515 nm<$\lambda$<1565 nm).

Acousto-optical switch 8 within device 10 is a 2×2 filter that is selective in respect of wavelength and has a response independent of polarization. Switch 8 can be used to select optical signals between the two inputs 202 and 203 and the two outputs 204 and 205 according to the wavelengths of the optical signals and the values of suitable control signals.

By means of control signals (not shown), it is possible to change the transmission state of switch 8 for a selected wavelength in one of two modes. First, with reference to FIG. 1, a cross mode may be used that connects first input port 202 to first output port 205 and connects second input port 203 to second output port 204. Alternatively, bar mode may be used, which connects first input port 202 to second input port 203 and connects second output port 204 to first output port 205. The acousto-optical switch 8 is also symmetrical, in the sense that, in both bar mode and cross mode as defined above, it is possible to exchange the radiation input ports with the output ports without changing the operation of the filter.

The operation of this integrated acousto-optical device is based on the interaction between light signals, propagated in waveguides formed on a substrate of birefringent and photoelastic material, and sound waves propagated on the surface of the substrate and generated by means of suitable transducers supplied by radio-frequency signals. The interaction between a polarized optical signal and a sound wave produces a polarization conversion of the signal, in other words a change of the polarization from its TE (transverse electric) component to the TM (transverse magnetic) component, which are orthogonal to each other, and vice versa. Following this interaction with the sound wave, the polarization components undergo not only the conversion to the corresponding orthogonal components, but also a frequency shift. This shift has an absolute value equal to the frequency of the interacting sound wave (and therefore equal to that of the applied radio-frequency signal). As well, the frequency shift has a sign that is a function of the state of polarization and of the direction of propagation of the sound wave with respect to the optical wave. Table 1 summarizes these relationships.

TABLE 1

| Polarization | Propagation | |
|---|---|---|
| | Collinear | Contra-linear |
| TE | + | − |
| TM | − | + |

The radio frequency used to feed the two transducers within switch 8 is the same, so the frequencies of the acoustic wave, and the frequency shifts induced in the two converters, are the same magnitude. Both converted polarizations then, out of a single passage through the filter, show an equal frequency shift, $+f_{RF}$ or $-f_{RF}$, the sign depending on the port of input (port 204 or 203 for plus, port 202 or 205 for minus, referring to FIG. 1).

In these acousto-optical filters, it is possible to tune the spectral response curve by controlling the frequency of the sound waves, which enables the selection of the signals to be modified without changing the wiring of the components. These acousto-optical components can also be used to switch and simultaneously select radiation at various wavelengths, if the sound wave propagating on the surface of the substrate is the superimposition of different sound waves. Such switching and selecting can occur because the acousto-optical filter carries out the combined selection of the signals at the wavelengths corresponding to the frequencies applied simultaneously to the electrodes of the electro-acoustic transducers.

Figure 2:
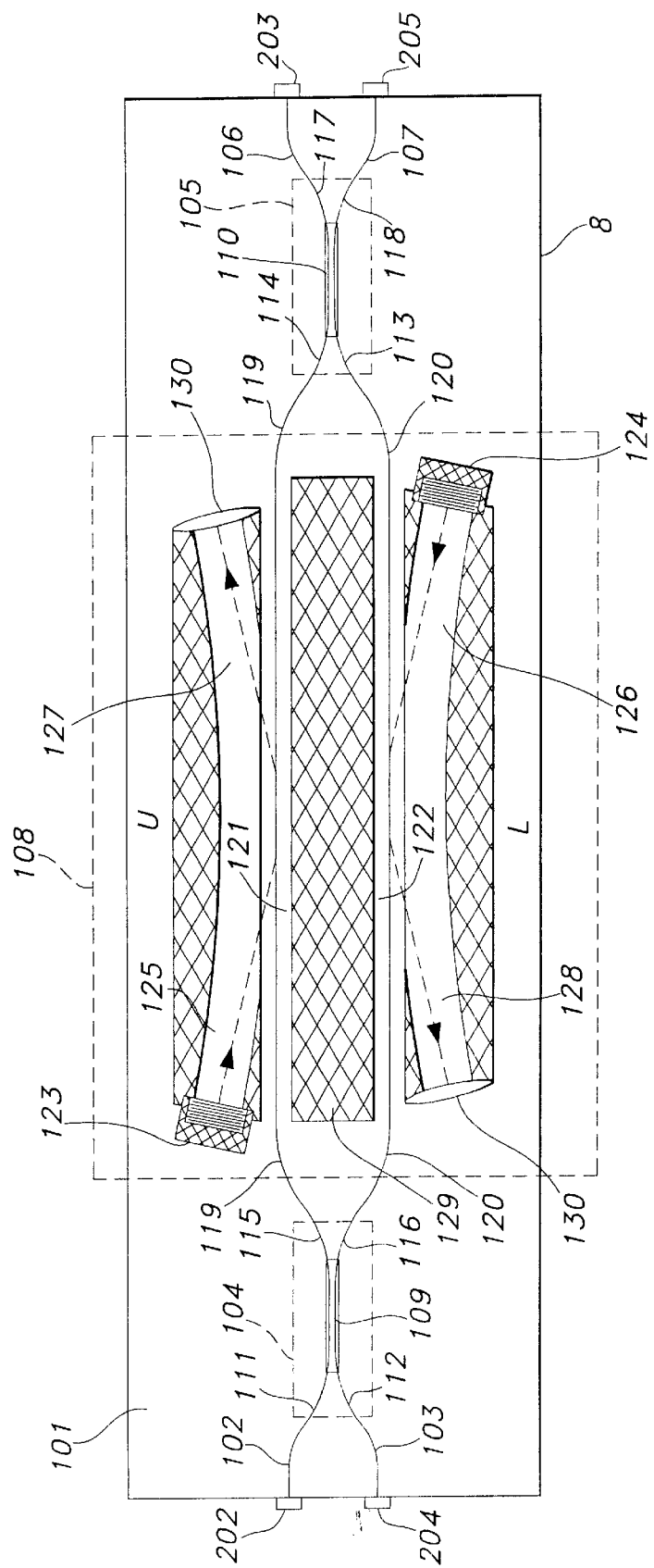
FIG. 2 shows an acousto-optical switch of an embodiment of the present invention.

An acousto-optical switch 8, in one particular embodiment, suitable for the purposes of the invention, is shown in FIG. 2. The filter comprises a substrate 101 made from birefringent and photoelastic material, consisting of lithium niobate ($LiNbO_3$). Two optical waveguide branches 102 and 103, connected to the two ports 202 and 204, are formed in the substrate 101. Two selective polarization elements 104 and 105, a conversion stage 108, and two output optical waveguide branches 106 and 107, connected to the ports 203 and 205, are also formed in the substrate 101.

The selective polarization elements 104 and 105 preferably consist of polarization dividers, formed by zero-gap wave directional couplers. These components can separate two corresponding polarizations supplied to a common input onto two output waveguides, and also combine two corresponding polarizations supplied to two separate input waveguides into a common output waveguide. In particular, each of polarization elements 104 and 105 comprises a central optical waveguard 109 and 110 respectively, and corresponding pairs of input and output waveguides 111, 112, 113, 114, 115, 116, 117, 118, respectively. These selective polarization elements are symmetrical; in other words their behavior does not change if the input optical waveguides are used as output guides and vice versa.

Conversion stage 108 within switch 8 comprises two conversion regions, referred to in the course of the present description as the upper converter U and the lower converter L. The upper converter U comprises an optical waveguide branch 119 connected to the output guide 115 of the polarization divider 104 and to the input waveguard 114 of the polarization divider 105. Upper converter U also comprises the acoustic waveguard 121. The lower converter L comprises an optical waveguide branch 120 connected to the output guide 116 of the polarization divider 104 and to the input waveguard 113 of the polarization divider 105. Lower converter L also comprises the acoustic waveguard 122.

A sound central cladding 129 separates acoustic waveguides 121 and 122. Two piezoelectric transducers 123 and 124, which are connected to the radio-frequency generator 6 in FIG. 1 by means of a radio-frequency splitter (not shown), are formed by a pair of interdigitated electrodes. Transducers 123 and 124 can generate a surface sound wave at radio frequency and are positioned within acoustic waveguides 125 and 126, respectively. Acoustic waveguides 125 and 126 communicate with acoustic waveguides 121 and 122, respectively, in such a way as to form acoustic couplers.

The sound waves generated by the electro-acoustic transducers 123 and 124 propagate along the corresponding parallel acoustic guides 121 and 122 in opposite directions and in such a way that they can interact with the electro-magnetic waves that propagate in optical guides 119 and 120. The sound waves are then coupled to portions of acoustic guides 127 and 128, respectively. Sound absorbers 130 at the termination of acoustic guides 127 and 128 prevent reflection of the sound waves.

Patent application EP 97113188.3 in the name of the Applicants describes an acousto-optical device suitable, for example, for use in the device shown in FIG. 1. An acousto-optical filter suitable for use in the present invention and of the same type as that described above is, for example, the PIRAOS-150X produced by the Applicants. Usually, a plurality of tunable 2×2 switches (generally four) that are wavelength selectable, are constructed in parallel on the same substrate, and independently usable. In addition, the end-faces (that is, the faces connected to the ports of the acousto-optical switch 8) are slant-polished (about 6°) or they have an anti-reflecting coating to avoid any back reflection. Of course, operationally similar devices may alternatively be used for the acousto-optical switch 8 of the present invention.

Figure 3A:
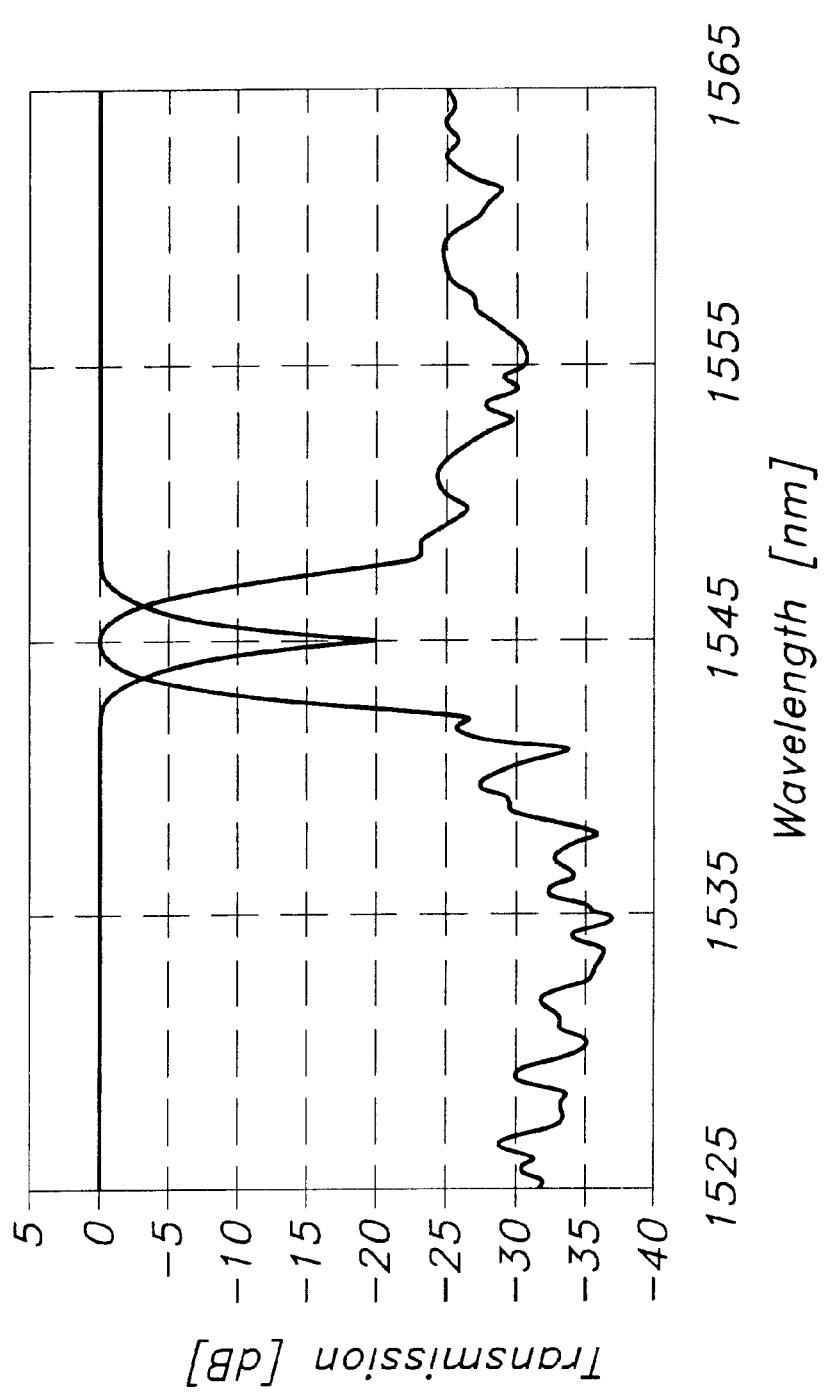
FIG. 3A shows diagrams of the characteristic curves of an acousto-optical filter of the type shown in FIG. 2.

FIG. 3A is a diagram of the characteristic curves of the PIRAOS-150X switch. From FIG. 3A, it will be seen that the depth of the cut-off curve, called the notch, is at least 18 dB, and the selection curve of the filter has a peak of 20 dB, both at a band center frequency of 1545 nm (for the specific radio frequency supplied). The operation of this device depends on the operating temperature, and therefore a heat regulation system using Peltier cells (not shown) is provided for each of the waveguides in which the polarization conversion takes place. The PIRAOS-150X device is generally kept at a stable temperature of 25° C.

Another characteristic parameter of these devices is the PDL (polarization dependent loss) which represents the difference between the losses occurring in the switch as a result of the two orthogonal polarizations TE and TM. The values of the further characteristic parameters of the PIRAOS-150X acoustic-optical filter will now be given.

Switching frequency: ~174.9 MHz (for 1545 nm)
RF power: 18.6 dBm; maximum losses: 6 dB
PDL: <0.5 dB
Cross talk: <−20 dB Tuning slope $\Delta\lambda/\Delta f$: −8.2 nm/MHz
Temperature coefficient $\Delta\lambda/\Delta T$: −0.9 nm/° C.
Switching bandwidth at −3 dB: 2.3 nm
Switching bandwidth at −10 dB: 4.2 nm
Side lobe level: <−19 dB.

The two converters L and U are in practice slightly different in the absolute value of the wavelength at which conversion happens for a given radio-frequency value. For the acousto-optic conversion in fact holds the relation:

$$\frac{2\pi}{\lambda}\Delta n_{eff} = \frac{2\pi}{\Lambda} \qquad (1)$$

where $\Delta n_{eff}$ is the difference between the effective refraction indexes in the optical waveguide (that is the birefringence in the guide), $\lambda$ is the wavelength at which the conversion happens, and $\Lambda$ is the acoustic wavelength.

For variations due to the fabrication process, the actual value of the birefringence is different in the two guides where conversion takes place for the two polarizations. With the sound wavelength (the radio frequency) the same, what results is a different conversion wavelength, $\lambda_U$ and $\lambda_L$ for the two converters, upper U and lower L. The difference $\Delta\lambda = |\lambda_U - \lambda_L|$ is normally in the order of 0.2 nm. The two converted polarizations are present then at the filter output with slightly shifted spectra, which normally causes a light widening of the overall filtering curve.

Acousto-optical device 10 shown in FIG. 1 can operate as a bandpass filter. Assuming that electromagnetic radiation at a number of wavelengths is present in the input optical fiber 3, the radiation at the desired wavelengths is selected by means of the radio-frequency generator 6 and will be present in the output optical fiber 2.

The operation of device 10 can be optimized for a particular wavelength by acting on the polarization controller 9 in such a way that the radiation travelling along the optical path between the first output port 205 and the second input port 203 undergoes no change of polarization state. The optimization can be made for all wavelengths if no overall rotation is assured with polarization-maintaining elements (fibers and isolator) between port 205 and port 203. In this case, properly selecting the orientation of the connection without using a polarization controller 9 can avoid polarization rotation.

The phase of selection of the wavelength for the device shown in FIG. 1, which uses, for example, the acousto-optical switch 8 shown in FIG. 2, will now be described in greater detail. For clarity of description, reference will be made to a particular example in which the polarization dividers 104 and 105 are of the type for which the incoming TE polarization, from any of the optical guides 111, 112, 115, 116 and 113, 114, 117, 118, is transmitted along the optical waveguide corresponding to cross transmission (for example, for the divider 104, the cross transmission is: 111–116), while the TM polarization is transmitted along the optical guide corresponding to bar transmission (for example, for the polarization divider 104: 111–115).

It will be evident to a person skilled in the art that this principle can be extended to the case in which the polarization dividers have the opposite behavior (bar transmission for TE polarization and cross transmission for TM polarization) to that described below. When an appropriate selection signal is applied to the electrodes of the transducers 123 and 124, the filter is switched to its on-state and changes to the cross transmission condition (cross-state) for the selected wavelengths. In this situation, input ports 202 and 203 are connected to the cross output ports, namely 205 and 204, respectively. For this purpose, the transducers 123 and 124 generate surface sound waves at radio frequency with a drive frequency $f_{RF}$ (approximately 170±10 MHz for devices operating at approximately 1550 nm, and 210±10 MHz for those operating at approximately 1300 nm). The drive frequency corresponds to the resonant optical wavelength where polarization conversion TE–TM or TM–TE takes place for which the selection is required.

The light radiation present at the input fiber 3 enters the first input port 202 and reaches the polarization divider 104, where the polarization components TE and TM are separated and travel through the optical waveguide branches 116 and 115, respectively. The TE and TM components then propagate into the acousto-optical conversion stage along the optical fibers 120 and 119, respectively. The polarization components having wavelengths different from that desired as the output wavelength (selected by the radio-frequency generator 6) pass unchanged through the branches 120 and 119 of the conversion stage 108 and are then sent to the polarization divider 105 in which they are recombined.

The radiation recombined in this way is sent in the waveguard 106 in such a way that it leaves the port 203 in unchanged form. The isolator 7 absorbs this radiation with non-selected wavelengths, transmitted from the port 203. However, the TE polarization components present at the first input port 202 at the predetermined wavelengths, selected by the radio-frequency generator 6, are converted into the orthogonal TM polarization state along the optical waveguard 120. During this conversion, the TE electromagnetic radiation is propagated in the opposite direction to that of the sound wave generated by the electro-acoustic transducer 124 and therefore, as shown in Table 1, it undergoes a frequency shift $\Delta f$ which is of negative sign $$\Delta f = \gamma_L - \gamma_L = -f_{RF} \qquad (2)$$

where $Y_L$ is the central frequency of the conversion peak for the lower converter L corresponding to the wavelength $\lambda_L$ defined above, $\gamma_L$ is the central frequency of the peak of the converted light at the output of the lower converter L, and $f_{RF}$ is the drive frequency of the transducers 123 and 124.

The TM radiation resulting from the conversion is transmitted by the polarization divider 105 to the optical waveguard 118 (bar transmission) and then to the first output port 205 and through the optical guide 107, of the acousto-optical switch 8. This radiation passes through the isolator 7 and the polarization controller 9, undergoing a zero rotation of polarization overall. This TM radiation is reintroduced into the same acousto-optical switch 8 through second input port 203. This radiation with TM polarization is sent by the optical fiber 106 within switch 8 to the polarization divider 105, which transmits it from the optical waveguard 117 to the waveguard 114. Along optical fiber 119, the radiation with TM polarization passes in the direction opposite to that of the sound waves generated by the electro-acoustic transducer 123.

In this acousto-optical interaction, the TM–TE conversion takes place at the conversion wavelength of the upper converter U ($\lambda_U$) and there is a frequency shift with a value of:

$$\Delta f' = \nu'_U - \nu_U = +f_{RF} \qquad (3)$$

where $V_U$ is the central frequency of the conversion peak for the upper converter U to which a wavelength $\lambda_U$ corresponds, and $V'_U$ is the central frequency of the peak of the converted light at the output of the upper converter U.

The light then undergoes a first conversion centered on the wavelength $\lambda_L$ and a second centered on the wavelength $\lambda_U$. The light is thus converted with a conversion function equal to the product of the two conversion functions relating to the two converters, namely the lower U and the upper L. This conversion function has a center wavelength at a wavelength $\lambda_m$ intermediate between the two wavelengths $\lambda_L$ and $\lambda_U$. Applicants have also observed that the total frequency shift $\Delta f_{tot}$ is zero:

$$\Delta f_{tot} = -f_{RF} + f_{RF} = 0. \qquad (4)$$

For the TM radiation entering acousto-optical switch 8 shown in FIG. 1 through the input port 202 analogous considerations can be made. Then, the overall frequency shift $\Delta f_{tot}$ will again be zero. Therefore, in the acousto-optical bandpass filter shown in FIG. 1 the frequency shift is null.

In addition, because the TM light will again experience conversion through both the filtering function of the two converters upper U and lower L, the overall central wavelength of conversion will then be again $\lambda_m$. That is to say, for the device shown in FIG. 1, there is no conversion wavelength difference between the two polarizations and, thus, no widening of the overall radiation spectra.

In this configuration, shown in FIG. 1, light performs a double-pass through the acousto-optic switch 8. This configuration shows all the advantages of a double-stage configuration. Specifically, the filtering performance of the switch 8 is doubled. Starting with switch 8 with 20 dB of extinction ratio and 20 dB of sidelobe suppression, one can obtain a filter with more than 30 dB extinction ratio and more than 30 dB sidelobe suppression due to the double passage of the light signal through the single-pass transfer function. The passing bandwidth spectrum is reduced to ⅔ of the single-pass bandwidth.

With respect to conventional double-stage devices having a common substrate, as the one of patent application EP 0814364 A1, Applicants have experimented with varying the temperatures of the stages separately and with providing separate radio frequencies for the stages to obtain matching between the stages. In an attempt to obtain the optimal thermal condition for the best performance of the overall filter or switch, Applicants have controlled separately the temperatures of the two stages with a precision of about 0.1° C. Moreover, another possible approach would be to drive each single stage with its own radio frequency. If there is some mismatching between the first and second stages, the two radio frequencies must be calibrated separately to assure optimal superposition between the filtering curves of the two stages.

The configuration of FIG. 1 of the present invention, in contrast, has the advantage of performing double pass through the same filter, whereby matching of the characteristics of the first and second stages is automatically guaranteed. Applicants have observed that in the configuration of FIG. 1 just one temperature stabilization must be performed and there is no need of keeping two temperatures matched. In addition, just one radio frequency is required, and the first and second stage filtering curves are always perfectly aligned automatically. In this way, the device of FIG. 1 is much simpler to optimize and to use than the traditional one.

If the polarization rotation, between port 205 and port 203 equals 90° instead of zero, frequency shift compensation is still provided, but the wavelength shift of the converted polarizations is no longer compensated. Each polarization in fact experiences two passages through the same converter, and shows a filtering curve slightly shifted compared with that of the orthogonal polarization. As a result, the overall bandwidth results slightly changed.

When no polarization control is provided, then light can suffer any rotation between ports 205 and 203. Therefore, frequency shift compensation is still assured, while wavelength shift compensation is not. This results in intermediate performances between the best case (0°) and the worst case (90°).

By means of the polarization controller 9 one can obtain zero rotation, and thus wavelength shift compensation for a certain value of wavelength. As this is changed, however, dispersion in fibers will alter polarization rotation and compromise wavelength shift compensation. Full compensation is provided for any wavelength if zero polarization rotation is fixed between ports 205 and 203 by means of polarization-maintaining fibers and isolator.

To summarize, at least three embodiments of the device, corresponding to successive improvements, are possible: (1) a device without polarization control between port 205 and 203, which provides wavelength-independent frequency shift compensation; (2) a device with polarization control between ports 205 and 203, which provides wavelength-independent frequency shift compensation and fixed-wavelength wavelength shift compensation (device 10 shown in FIG. 1); and (3) a device with polarization-maintaining elements between port 205 and 203, which provides both wavelength-independent frequency shift and wavelength shift compensations.

Applicants note that wavelength shift compensation may not be required in some circumstances, such as if switch 8 shows negligible non-uniformity of birefringence or if the notch depth is not critical. In these cases, the configurations without polarization control provide acceptable solutions for frequency shift compensation.

In the double-stage device of patent application EP 0814364 A1, two filters are integrated on the same chip. With the configuration of FIG. 1 of the present invention, only one filter is integrated on the chip with more space available for it. In this way, the single stages of the configuration of FIG. 1 can be made with higher performances than the single stages of the double-stage device of the above-mentioned patent application, and the performances of the overall filter are improved.

In the device of FIG. 1, the passage of light between the first and the second stage is exploited by a fiber connection, while in the double-stage single-chip device of the above-mentioned application, direct passage occurs through waveguides on the chip. Losses of switch 8 can be reduced by optimizing the efficiency in the pigtailing process for the waveguide-to-fiber connection of FIG. 1 or by using planar-optics or micro-optics technology for the connection.

Acousto-optical device 10 of FIG. 1 is suitable for operating as a band-stop filter by inverting the direction of the optical isolator 7. In this case, the non-converted light is not stopped any more by the isolator, which on the other hand stops the converted light coming from output port 205. As a result, the non-converted light is present at output port 204 after a double passage in the device. This configuration acts then as a notch filter.

This device can operate, as above mentioned, even if no polarization control is used. Again, if polarization controller 9 is inserted and polarization rotation between the port 205 and 203 is set to zero, the light of each polarization undertakes a passage through both converters. Consequently, there is no difference between the wavelength of conversion for the TE and TM, resulting in perfectly overlapping notch curves.

Optimization must be done for each value of the selected wavelength. With polarization-maintaining elements, moreover, the effect is maintained for all wavelengths. Obviously, there is no frequency shift issues, because the light observed is that which has not been converted. This configuration for the band-stop filter shows the same advantages of the bandpass filter. The filtering performances can be doubled and starting with a switch 8 with 20 dB of notch depth, one can obtain a double-stage filter with more than 30 dB of notch depth.

Figure 3B:
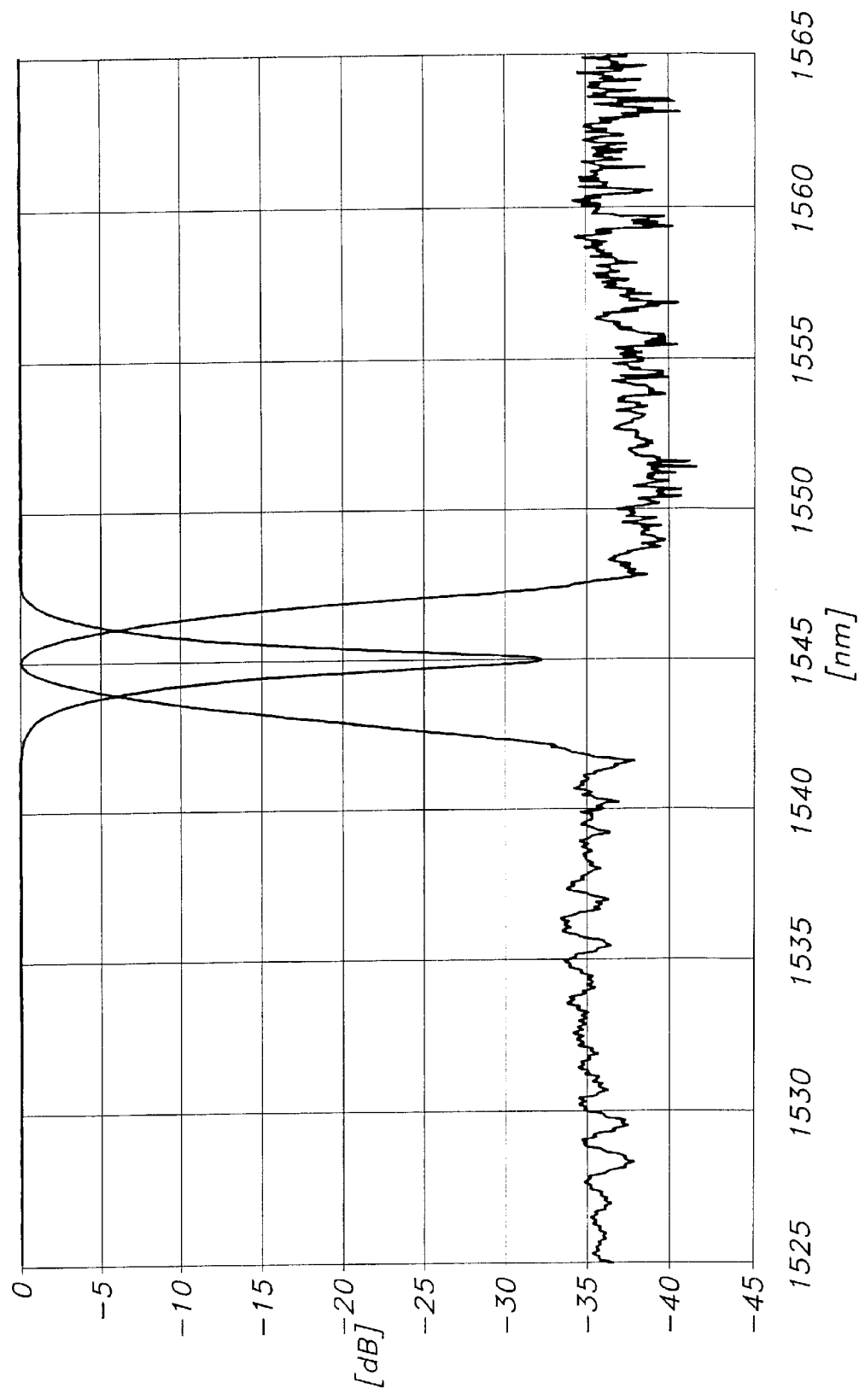
FIG. 3B shows diagrams of the characteristic curves of the device of FIG. 1.

Applicants have observed that the configuration of FIG. 1 (with proper polarization control between ports 203 and 205) and compensation of the wavelength shift between the two polarizations is advantageous because it helps to obtain maximum notch depth for light not in the TE or TM polarizations. Moreover, Applicants have found experimentally that the device described in the patent application EP 0814364 A1, has a notch extinction equal to about 32 dB. On the other hand, the notch and filter characteristics of acousto-optical device 10 of FIG. 1 are diagrammed in FIG. 3B and show a notch depth of more than 30 dB.

The improved performance of device 10 of FIG. 1 are possibly reached due to the double passage that occurs single-stage switch 8 (for example, a PIROAS 150-X), which has better performance than the single stage of the device described in the application mentioned above. In fact, the double-stage acousto-optic device being made in a single substrate with potential problems in the manufacturing process cause a decreased performance than that achieved for the single-stage device.

The value of the rotation for each selected wavelength can be optimized independently by inserting and adjusting the position of polarization controller 9 of the type described above until the minimum passing bandwidth, or the maximum depth of the notch, is obtained on a suitable Optical Spectrum Analyzer. This adjustment step with the polarization rotation can be avoided by using fiber and devices (as the isolator 7) with polarization maintenance within the optical path from port 205 to port 203. In this case, the overall rotation of polarization can be controlled by setting appropriately the orientation of the fiber at the connection with the ports 205 and 203, without need for the polarization controller 9.

Further embodiments will be described with reference to figures in which are used the same numbering to identify components of the type already mentioned. These embodiments comprise optical circulators that are optical passive devices having ports (three or four in these examples) sequentially ordinate as shown in the following figures by an arrow. In general, the radiation entering one of the ports is transmitted towards only one of the others ports and, more particularly, the following one in accordance with the pre-established direction. Nevertheless, for the last port, according to the sequence, the entering radiation is not transmitted to a subsequent port. These type of circulators are commonly called open circulators.

Instead, the so-called closed circulators permit the transmission, in a pre-established direction, between each port. Closed circulators can be also used by properly inserting isolators where required. In the following figures, the arrow shows the fixed direction and connects only the ports between which the transmission is possible.

An optical circulator suitable to be used in the following embodiments is for example an E-tek Model PIFC2TF341000 (four-port circulator) or Model PIFC2PR504000 (three-port circulator). However, equivalent devices will be apparent to those skilled in the art.

In each of the following figures, in every connecting ring on the backside of the device is indicated the value of polarization rotation that must be provided in the ring to allow optimization of performances, that is, wavelength shift compensation. If the value of polarization rotation is not explicitly listed, no polarization control is intended, and only frequency shift compensation is provided. With the indicated polarization control, wavelength shift is also compensated for one wavelength at each time. With polarization-maintaining elements, full compensation is assured for all wavelengths.

Figure 4:
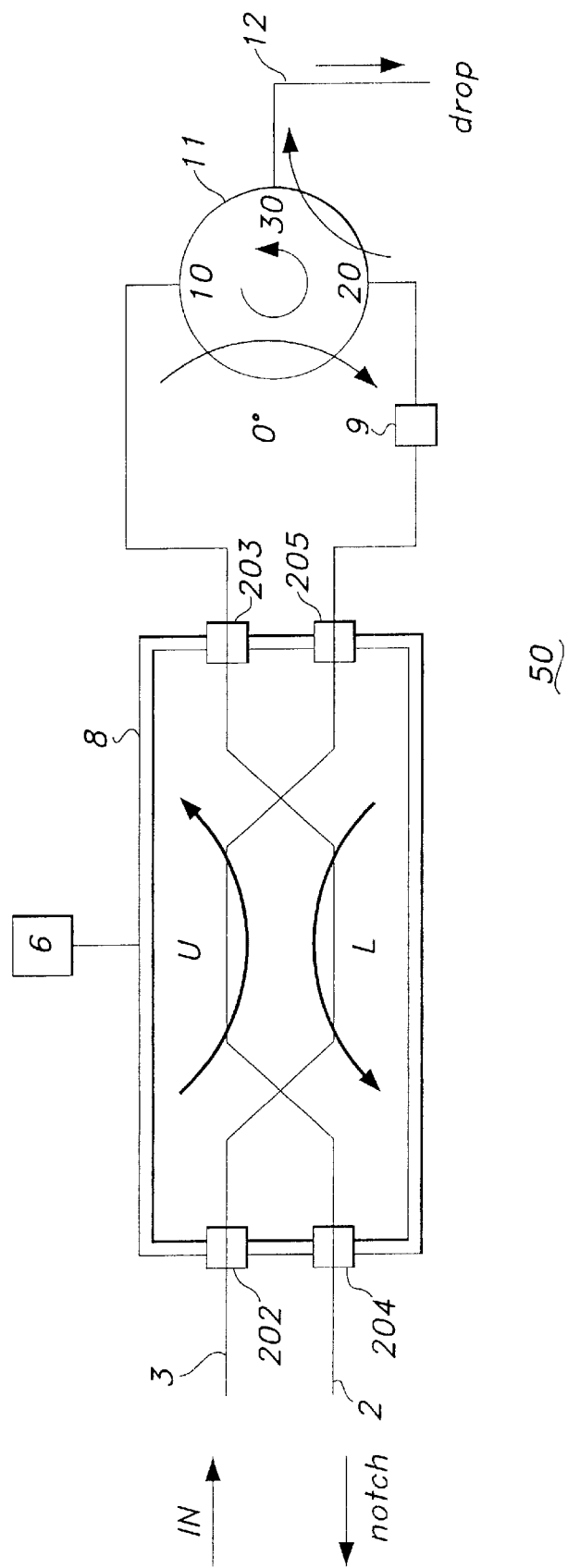
FIGS. 4 and 5 show schematically two drop filters according to another embodiment of the invention, each of which uses an optical circulator.

FIG. 4 shows an acousto-optic device 50 of another embodiment of the present invention. Acousto-optic device 50 comprises an input fiber 3 connected to a first input port 202 of an acousto-optic switch 8 piloted by a radio-frequency generator 6. A first output port 205 of the acousto-optic switch 8 is optically connected to a port 20 of a three-port optical circulator 11, through a polarization controller 9 (if required). The optical circulator 11 has a port 30 connected to a fiber 12 and a port 10 connected to the second input port 203 of the acousto-optic switch 8. The port 204 of the switch 8 is connected to the fiber 2.

The device 50 of FIG. 4 is suitable for operating as a drop filter for passing selected wavelengths from the device. The radiation at the wavelength to be selected, among the radiation entering the device through the fiber 3, is transmitted to the first output port 205 of the switch 8, piloted by the radio-frequency generator 6, and thus to the port 20 of optical circulator 11. The radiation at the selected wavelengths from optical circulator 11 is transmitted through port 30 to fiber 12. Accordingly, device 50 of FIG. 4 performs a one-passage drop filter between the fibers 3 and 12.

Radiation at wavelengths different from the selected ones is not subjected to any polarization conversion in the acousto-optic switch 8 and is transmitted from the first input port 202 through the second output port 203 to the port 10 of the optical circulator 11. From the port 20 of the optical circulator 11 this radiation is re-inserted in the acousto-optic switch 8 and thus is transmitted to the fiber 2. The radiation corresponding to the notch output at the fiber 2, thus, experiences two passages in the acousto-optic switch 8.

Figure 5:
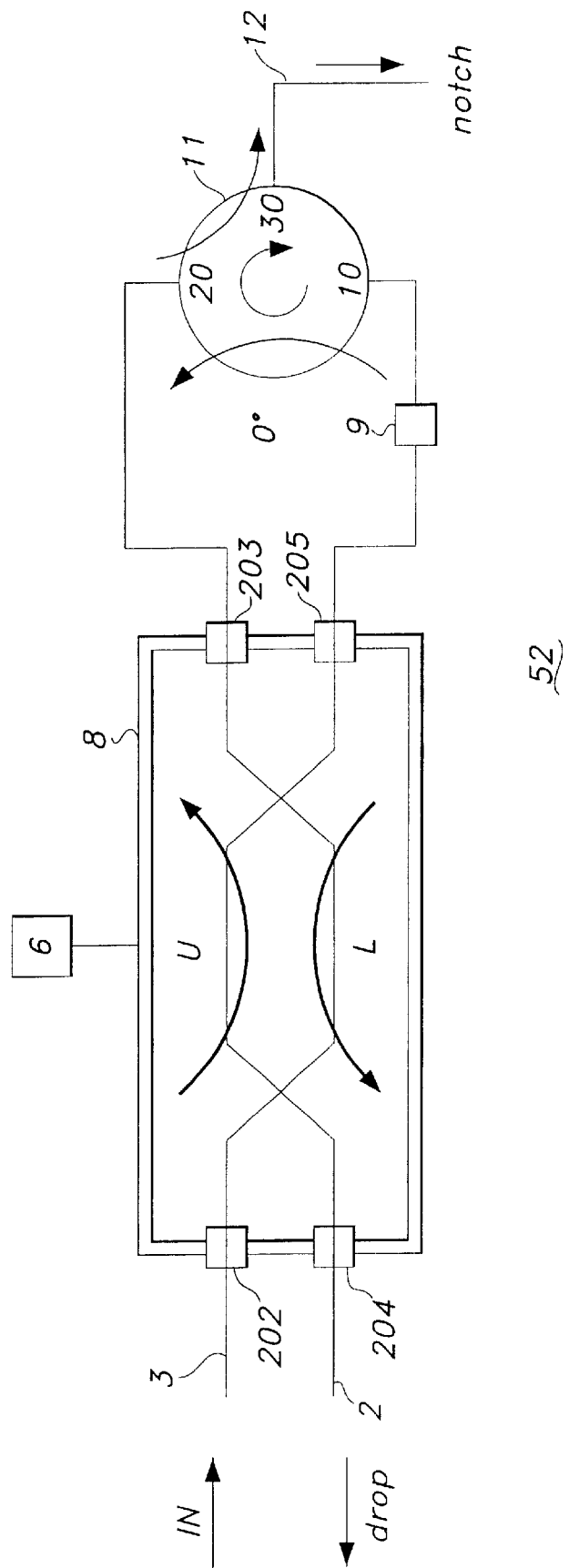

FIG. 5 shows another acousto-optic device 52 in which the first output port 205 of the acousto-optic switch 8 is optically connected to the port 10 of the three-port optical circulator 11, through a polarization controller 9 (if required). Optical circulator 11 has a port 30 connected to a fiber 12 and a port 20 connected to the second input port 203 of the acousto-optic switch 8.

The operation of drop filter 52 of FIG. 5 is analogous to the operation described in reference to device 50 of FIG. 4. For device 52 of FIG. 5, the radiation corresponding to the notch output at fiber 12 undergoes one passage in the acousto-optic switch 8. Instead, the selected wavelengths that correspond to the drop output at fiber 2 experience two passages through the acousto-optic switch 8.

In these last configurations, device 50 of FIG. 4 and device 52 of FIG. 5, are improved versions of the configurations of device 10 shown in FIG. 1. In fact, they operate in the same manner, realizing a notch or a bandpass filter with almost double the performance of a double-stage integrated device. Compared with device 10, notch filter 50 of FIG. 4 does not discharge the light of the stopped bandwidth, but makes it available on a fiber output at fiber 12 after a single passage through switch 8. In the same way, bandpass filter 52 of FIG. 5 does not discharge the light outside the passing bandwidth, but makes it available on fiber output 12. Thus, the devices of 50 and 52 provide a drop filter, that is a device in which both the passing spectra and the light outside it are split on different outputs.

In the configurations of FIGS. 4 and 5, only one of the two outputs exits after a double passage through the acousto-optic device, the other exiting after a single passage. Because of this configuration, FIG. 4 provides a double-pass notch filter 50 with single-pass drop recovery, and FIG. 5 provides a double-pass bandpass filter 52 with single-pass notch recovery. In FIG. 4, the dropped light, coming out after a single passage in the device 8, shows equal frequency shifts on the two polarizations. In both FIGS. 4 and 5, the single pass output has non-compensated wavelength shift.

Figure 6A:
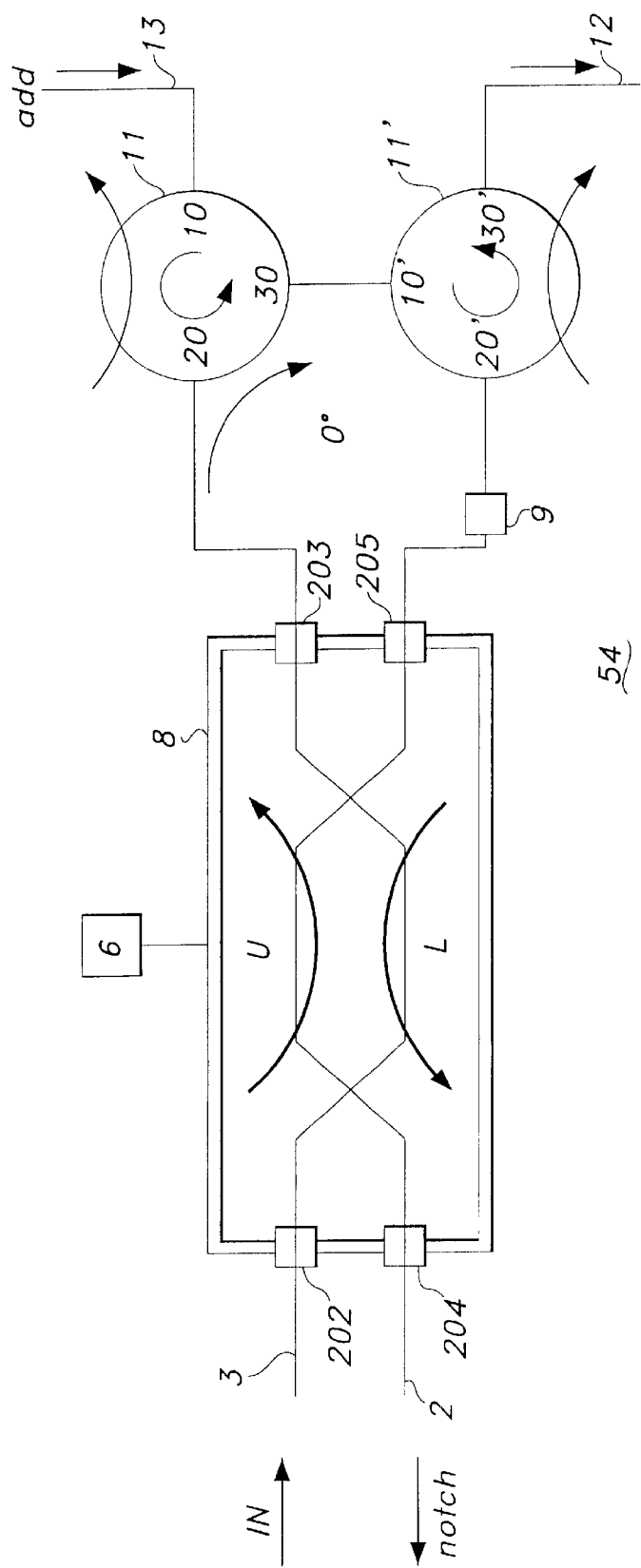
FIG. 6A shows schematically an add/drop filter according to another embodiment of the invention, which uses two optical circulators.

FIG. 6A shows an additional embodiment of the present invention that operates as an add/drop filter. The acousto-optic device 54 of FIG. 6A comprises an input fiber 3 connected to a first input port 202 of an acousto-optic switch 8 piloted by a radio-frequency generator 6. A first output port 205 of the acousto-optic switch 8 is optically connected, through a polarization controller 9, to a port 20' of a three-port optical circulator 11'. The optical circulator 11' has a port 30' connected to a fiber 12 and a port 10' connected to port 30 of the optical circulator 11. Port 20 of the optical circulator 11 is connected to the second input port 203 of the acousto-optic switch 8, while port 10 is connected to a fiber 13. The port 204 of the switch 8 is connected to the fiber 2. The optical circulator 11' and 11 are of the same type before described.

The radiation at the wavelengths to be selected, among the radiation entering the device through the fiber 3, is transmitted to the first output port 205 of the switch 8. Subsequently, the selected wavelengths are passed from the port 20' of optical circulator 11' to the drop output at the fiber 12 via circulator 11'. Accordingly, device 54 of FIG. 6A realizes a single-passage drop filter between fibers 3 and 12.

The radiation at wavelengths different from the selected ones is not subjected to any polarization conversion in acousto-optic switch 8 and is transmitted from first input port 202 through second output port 203 to port 20 of optical circulator 11. From port 30 of optical circulator 11 this radiation is sent to port 10' and from port 20' is then reinserted in acousto-optic switch 8 and thus is transmitted to fiber 2. The radiation corresponding to the notch output at fiber 2, thus, experiences two passages in acousto-optic switch 8. As mentioned above, polarization controller 9 is not necessary.

The radiation added from fiber 13 in consequence of a single passage in acousto optic switch 8 is sent to fiber 2. The optical isolator 14 is necessary to absorb the portion of the radiation introduced at fiber 13 that is not deviated to fiber 2. Radiation of this kind can be light outside the selected conversion bandwidth of the acousto-optic device, that is always driven to port 202 when injected through fiber 13, or the light to be added itself (that is inside the conversion bandwidth) when the RF is turned off.

The optical isolator 14 is not necessary if any of the following cases occur: 1) there is no light outside the add bandwidth at input fiber 13 and the light inside the add bandwidth is present only when add is turned on; or 2) the presence of light traveling out of the device at input fiber 3 is not a problem for the device connected to the filter through this fiber. The added and dropped light shows uncompensated equal frequency shift and uncompensated wavelength shift, coming out of a single passage through switch 8.

Figure 6B:
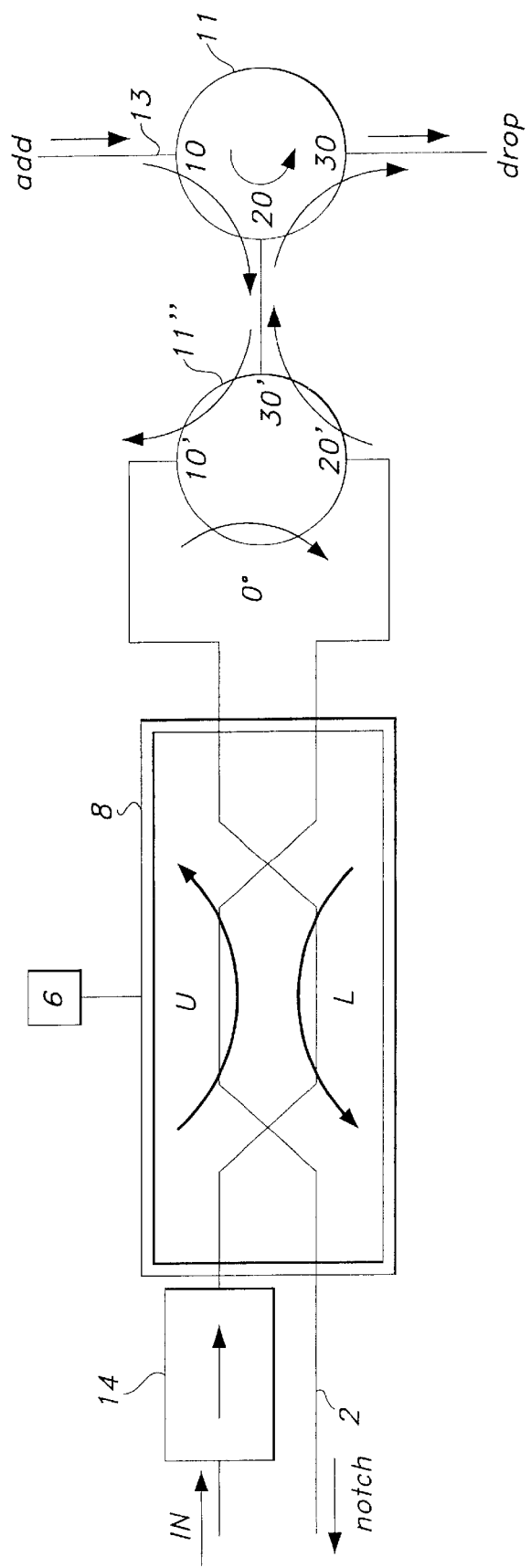
FIG. 6B is an alternate embodiment that uses a closed optical circulator.

FIG. 6B shows an alternative configuration including a closed three-port optical circulator 11 and an open three-port optical circulator 11". No optical isolator is employed other than isolator 14.

Figure 7:
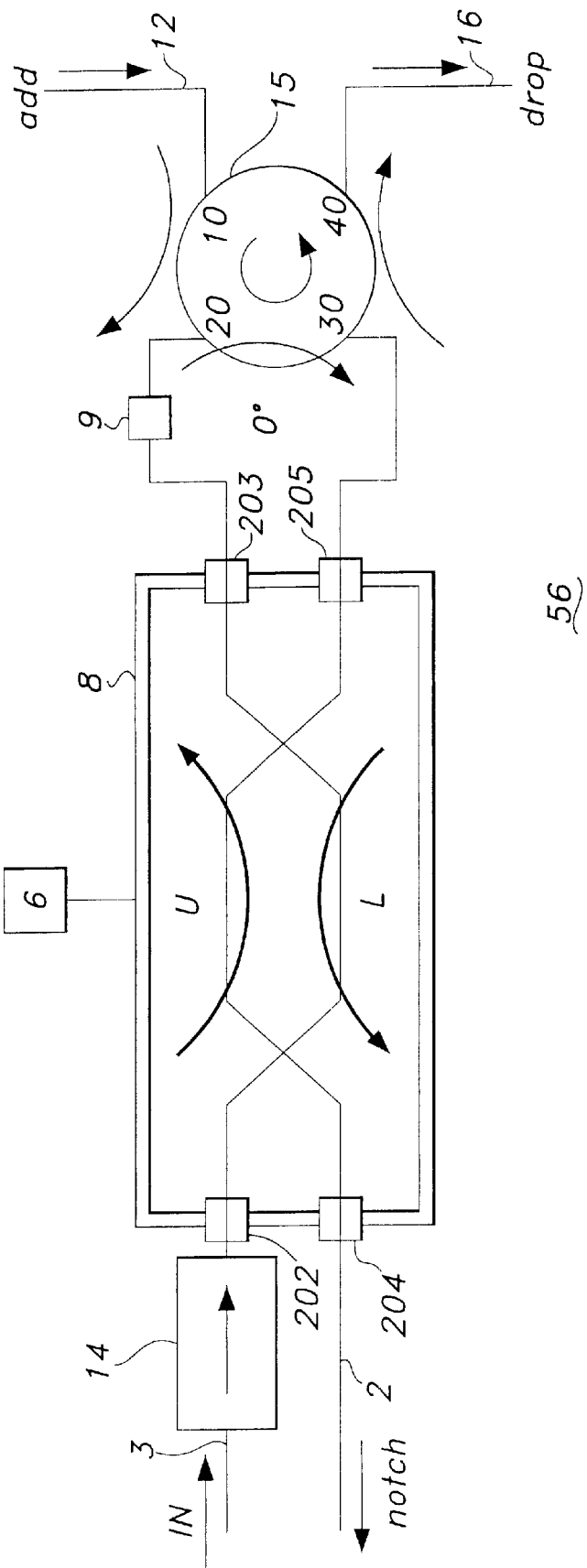
FIG. 7 shows schematically an add/drop filter according to another embodiment of the invention, which uses an optical circulator.

FIG. 7 shows another acousto-optic device suitable for operating as add/drop filter. This acousto-optic device 56 comprises an input fiber 3 connected, through an isolator 14 or similar device, to the first input port 202 of acousto-optic switch 8 piloted by a radio frequency generator 6. A first output port 205 of acousto-optic switch 8 is optically connected to a port 30 of a four optical circulator 15. Optical circulator 15 has a port 40 connected to fiber 16 and a port 20 connected, through a polarization controller 9 (used if required), to second input port 203 of acousto-optic switch 8. Port 204 of switch 8 is connected to fiber 2.

Radiation can be introduced in device 56 of FIG. 7 through fiber 3 and, in consequence of one-passage in acousto-optic switch 8, light at the selected wavelengths is sent at the drop output port corresponding to fiber 16. The radiation at wavelengths different from the selected ones experiences two passages in acousto-optic switch 8 and is transmitted to notch output port 2. Radiation to be added is introduced at fiber 12, connected to optical circulator 15 and passing only once acousto-optic switch 8 is transmitted to fiber 2. Optical isolator 14 has the same scope of the one of FIG. 6 and thus the same considerations can be made. Even in this configuration, the added and dropped light, coming out of a single passage, show uncompensated frequency and wavelength shifts.

Figure 8:
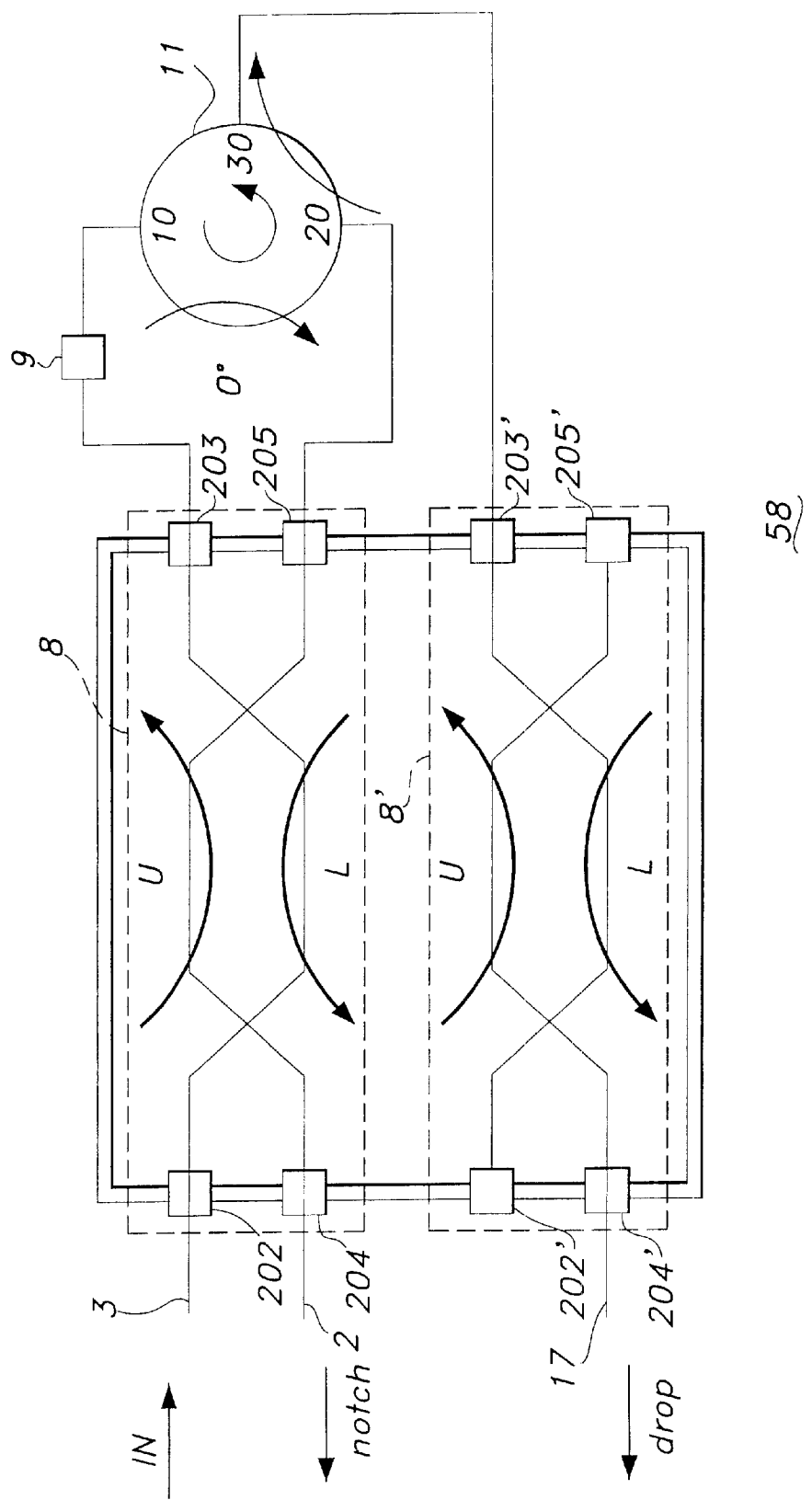
FIGS. 8 and 9 show schematically two devices according to another embodiment of the invention, each of which uses two parallel acousto-optical stages and an optical circulator.

FIG. 8 shows a drop filter 58 performing a double filtering of the selected light by a passage through the first acousto-optic switch 8 and a second acousto-optic switch 8'. This second acousto-optic switch 8' has ports 202', 203', 204' and 205' as shown in FIG. 8. The acousto-optic switches 8 and 8' are of the same types above described, and they are preferably made on the same substrate as the above-mentioned PIRAOS ones. The radiation at the wavelengths to be selected from fiber 3 is transmitted by optical circulator 11 to port 203' of second acousto-optic switch 8' and then through port 204' to a fiber 17. The port 204 of first acoustic-optic switch 8 is the notch port of the device as above described in reference to the FIG. 1.

In a less preferred embodiment, first and second optical switch are made on different substrates.

With this configuration, a double-pass notch filter with double-pass drop of the stopped bandwidth is obtained. Thus, it realizes a notch-drop filter with both notch and drop performances doubled with respect to initial switch 8. The configuration for the notch filter is the same as the one in FIGS. 1 and 4, with all the advantages of frequency shift compensation and wavelength shift compensation, if proper polarization control is assured.

In addition, with the device 58 of FIG. 8, it is assured that the notch output, experiences a second passage in the same filtering device and under same overall conditions. For the drop filter, the second passage is performed as in FIGS. 1 and 5, but through a "twin" filter preferably integrated on the same chip by the side of the other one rather than through the same filter. For the drop aspect of device 58, the frequency shift is again compensated, while some wavelength shift remains uncompensated due to the technological variations of the birefringence in the second device with respect to the first one. These variations however are much reduced with respect to the double-stage device previously described. The two stages for drop are integrated side-by-side at a very reduced distance one from the other such that the technological variations can be retained below undesired values. In conventional double-stage acousto-optical devices on a single chip, the two filter stages were cascaded on the same chip, that is, placed one after the other along the chip, at a distance much higher than in the configuration of FIG. 8. Such a prior design contains larger technological variations than does the inventive layout of FIG. 8. The resulting wavelength deviation for the drop for the two polarizations then is much lower in the configuration of FIG. 8 than in the conventional double stage configuration. The integration of multiple acousto-optic filters side-by-side on a single chip, like in FIG. 8, minimizes technological problems.

For the connection from port 30 of the circulator to port 203' of switch 8', no optimal polarization rotation is indicated; in fact, second passage happens through a different switch 8' and compensation by polarization rotation is useless. This configuration then provides a double-pass notch with wavelength shift compensation and double-pass drop with frequency shift compensation but some wavelength shift between the polarizations.

One can find it more convenient to have some wavelength shift on the drop curve than on the notch curve, so that the notch depth can be maximized. This is the reason of the set up of the configuration in FIG. 8. However, one can obtain unshifted drop and slightly-shifted notch simply by connecting the ports of the circulator in FIG. 8 as they are connected in the circulator in FIG. 5, and connecting port 205' instead of port 203' of switch 8'.

Figure 9:
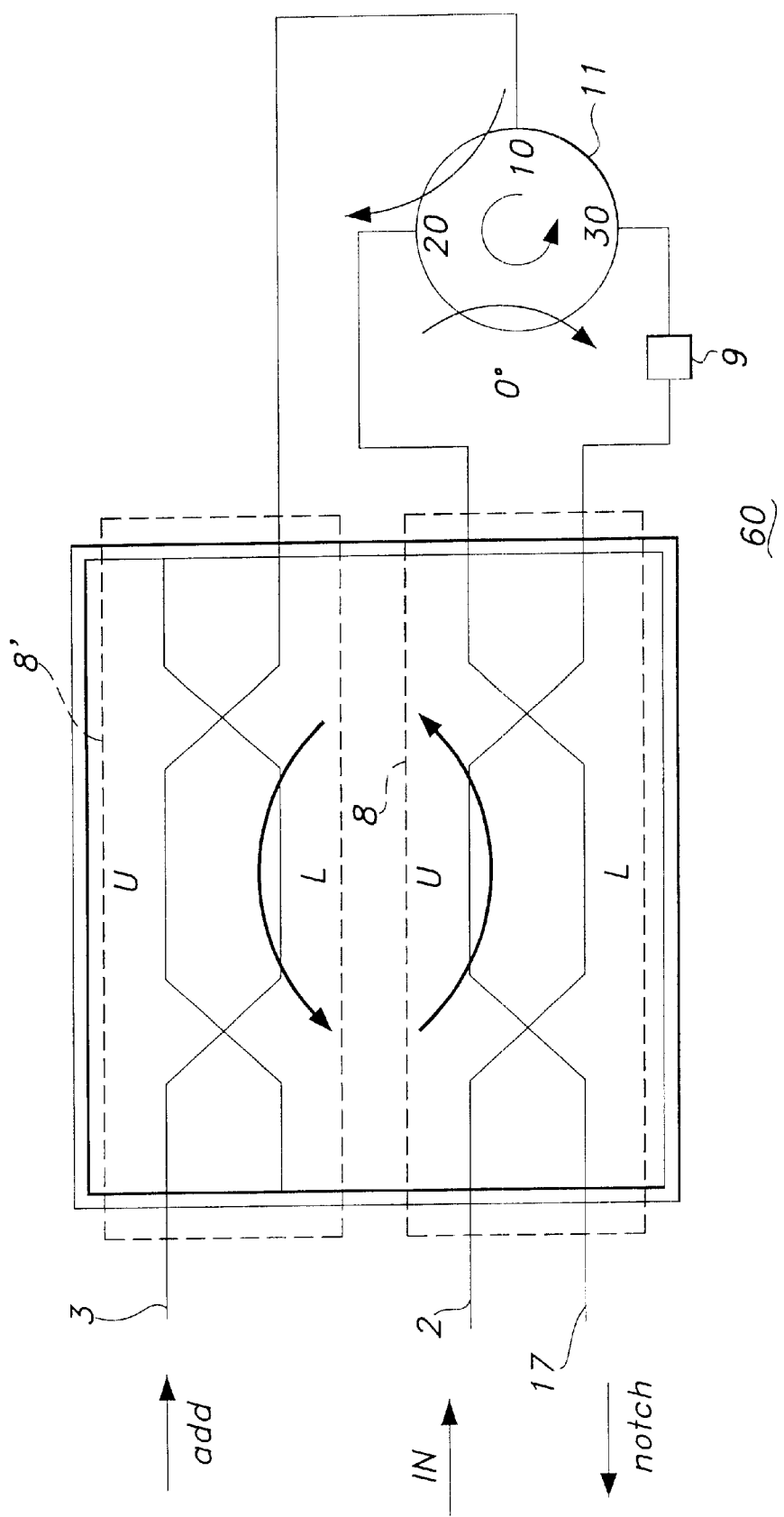

FIG. 9 illustrates an add filter 60 having a configuration analogous to device 58 of FIG. 8. In reference to the FIG. 9, fiber 3 is the add input port, fiber 17 is the notch output and the output port of the radiation added; and fiber 2 is the input port of the radiation to be filtered. The radiation corresponding to the notch output experiences two passages in switch 8, while the added radiation at fiber 2 is subject to a passage in the switch 8' and then in the switch 8.

This configuration gives a notch-add filter with both double-pass notch and add filters. As for the configuration in FIG. 8, the notch has full compensation of wavelength shift while the add has full compensation of the frequency shift but some wavelength shift between polarizations. The residual shift is, however, reduced compared with the conventional double-stage (cascade) configuration.

Figure 10:
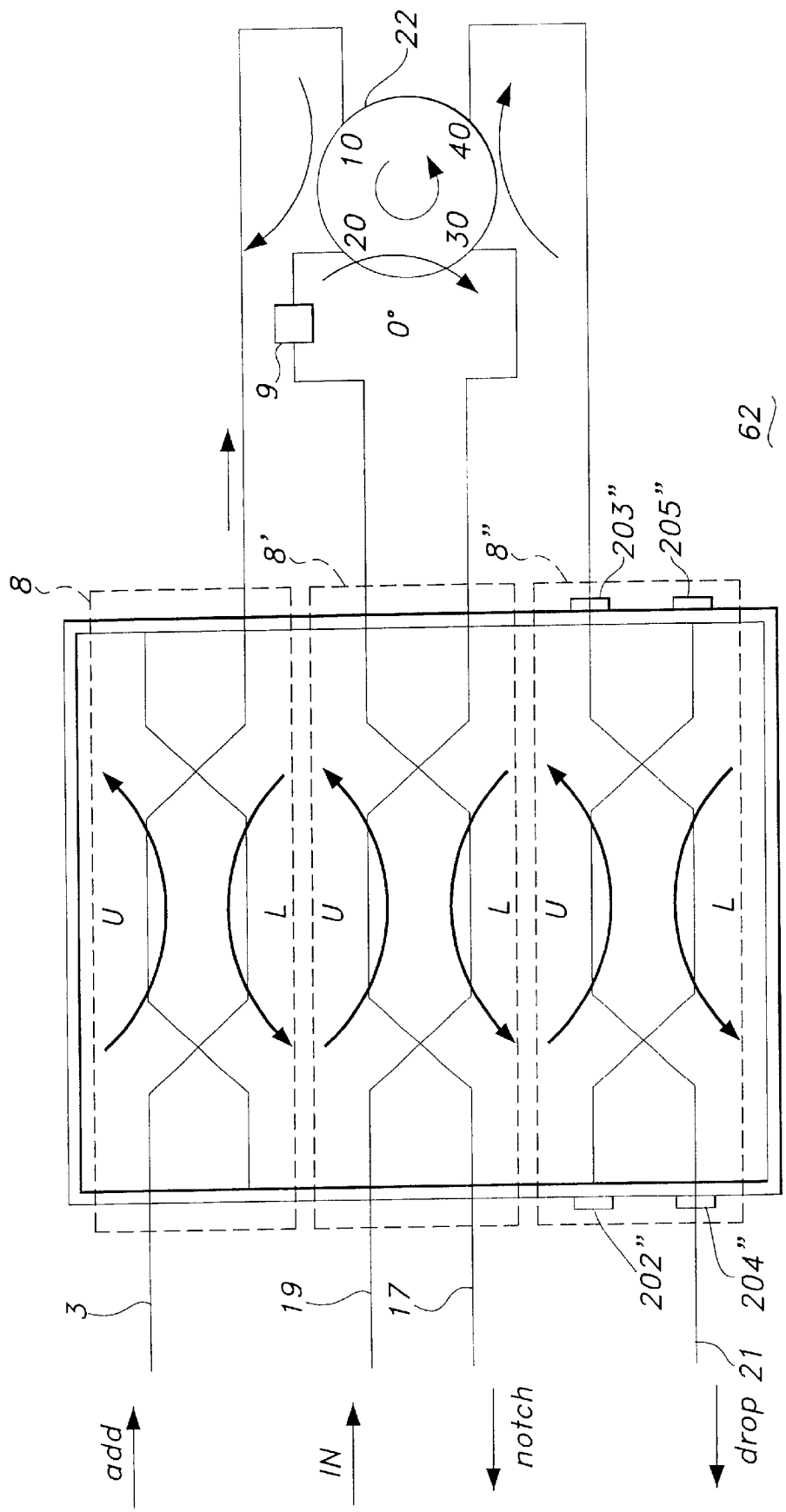
FIG. 10 shows schematically a device according to another embodiment of the invention, which uses three parallel acousto-optical stages and an optical circulator.

In FIG. 10 is illustrated an add/drop filter 62 that allows two filtering passages for each type of output. This add/drop filter includes three acousto-optic filters 8, 8', 8" preferably made on the same substrate and a four-port optical circulator 22. The acousto-optic switch 8" has ports 202", 204" (connected to a fiber 21), 203' (connected to the optical circulator 22) and 205".

Referring to FIG. 10, fiber 3 is the add input, fiber 19 is the input of the radiation to be filtered, fiber 21 is the drop output, and fiber 17 is the notch and add output. This configuration represents a merging of the configurations in FIGS. 8 and 9. It provides a full double-stage add/drop filter, with double-stage notch, drop and add filters. All these three functions can be performed with filtering performances that are nearly doubled compared to the integrated switch 8. As in the previous two configurations, notch has full compensation of wavelength shift, while add and drop have full compensation of the frequency shift but some wavelength shift. The wavelength shift is, however, reduced compared to that of the conventional double-stage add/drop filter.

Clearly, the double-stage add/drop illustrated in FIG. 10 compared with the conventional double-stage acousto-optic device retains all the advantages that come from controlling a single stage (temperature and radio frequency) compared with controlling and matching two stages separately (temperatures and radio frequencies). These advantages have been addressed above.

With reference to FIG. 1, an alternative way of obtaining wavelength and frequency shift compensation exists. This refers to the bandpass filter configuration. If the polarization between port 205 and port 203 is rotated by 90°, frequency shift compensation is obtained even if the acoustic frequencies, $f_U$ and $F_L$ on the two converters, U and L, are different. Referring for example to polarization TE entering from port 202, it undergoes conversion to TM in the lower converter L and gets a frequency shift: $\Delta f_1 = -f_L$. After passing from port 205 to port 203, polarization is again TE (with shift $\Delta f_1$), and light undergoes a second conversion again in the lower converter L. The frequency shift this time is: $\Delta f_2 = +f_L$. The overall frequency shift is then zero:

$$\Delta f_{tot} = \Delta f_1 + \Delta f_2 = -f_L + f_L = 0 \tag{5}$$

The conversion wavelength difference between the converters can then be compensated by driving each of them with its specific radio frequency, so as to obtain the same conversion wavelength as the other. The conversion happens this way at the same wavelength for the two polarizations. This way of operating the device requires two different radio frequency controls but allows both frequency shift and wavelength shift compensation. Polarization is controlled between ports 205 and 203. The same principles as discussed for FIG. 1 can readily be applied to the configurations of FIGS. 4–10, as will be readily apparent to one skilled in the art.

The following FIGS. 12–16 depict further embodiments of the present invention comprising a single converter acousto-optical device 23. These embodiments are suitable to achieve all the advantages of a double-pass filtering and the frequency shift compensation. Compensation of the wavelength shift due to non-uniformity of birefringence is in this case possible only for the notch output.

A device 23 suitable for use in the configurations of FIGS. 12–16 is, for example, described in the U.S. Pat No. 5,002, 349 or in the European patent application EP 0805 372 (U.S. Ser. No. 08/744 792). The single converter acousto-optical device 23, shown schematically in FIG. 11, has only one electro-acoustic transducer 216 (an arrow indicates the acoustic wave propagation direction) piloted by a radio frequency generator 6 and two acoustic absorbers 221. This device comprises input ports 212, 213 and output ports 214, 215. In addition, it comprises the optical waveguides 217 and 218 and the polarization beam splitter 219, 220.

The single converter acousto-optic device 23 has some advantages compared with the double converter device. With a single converter, the two waveguides that pass through the same acoustic waveguide can be placed very near one another; so the polarization splitter length decreases and a larger portion of the chip can be used for the converter. The length of the converter can be then increased, fixed by the chip length, and the filter bandwidth can be correspondingly reduced. Using two converters for the two polarizations instead forces a longer spacing between the optical waveguides, each placed in a different acoustic waveguide. The length of the polarization splitter sections increases and, fixed by the chip dimension, the allowed length of the converters becomes lower.

Thus, in the single-converter filter the converter can be made longer, and therefore with a smaller bandwidth, compared with the double-converter one. On the other hand, with a single-converter, filter frequency shift equalization can be obtained only with double passage, either in two different stages or through the same one, and not with a single-passage. The operation of device 23 is analogous to the one described for the acousto-optic device 8, but since the acoustic radiation has only one propagating direction the frequency shift happens differently.

More particularly, the TE radiation at the selected wavelengths entering the device 23 is transmitted from the polarization beam splitter 219 to the waveguard 218, where the acousto-optical interaction causes a polarization conversion and a frequency shift equal to $f_{RF}$. The TM radiation at the same wavelengths is transmitted from the polarization beam splitter 219 to the waveguard 217 where the acousto-optical interaction causes a polarization conversion and a frequency shift equal to $-F_{RF}$. The frequency shift between the two polarizations is thus nonzero after a single passage, and in particular is twice the frequency of the acoustic wave $2f_{RF}$.

Figure 12:
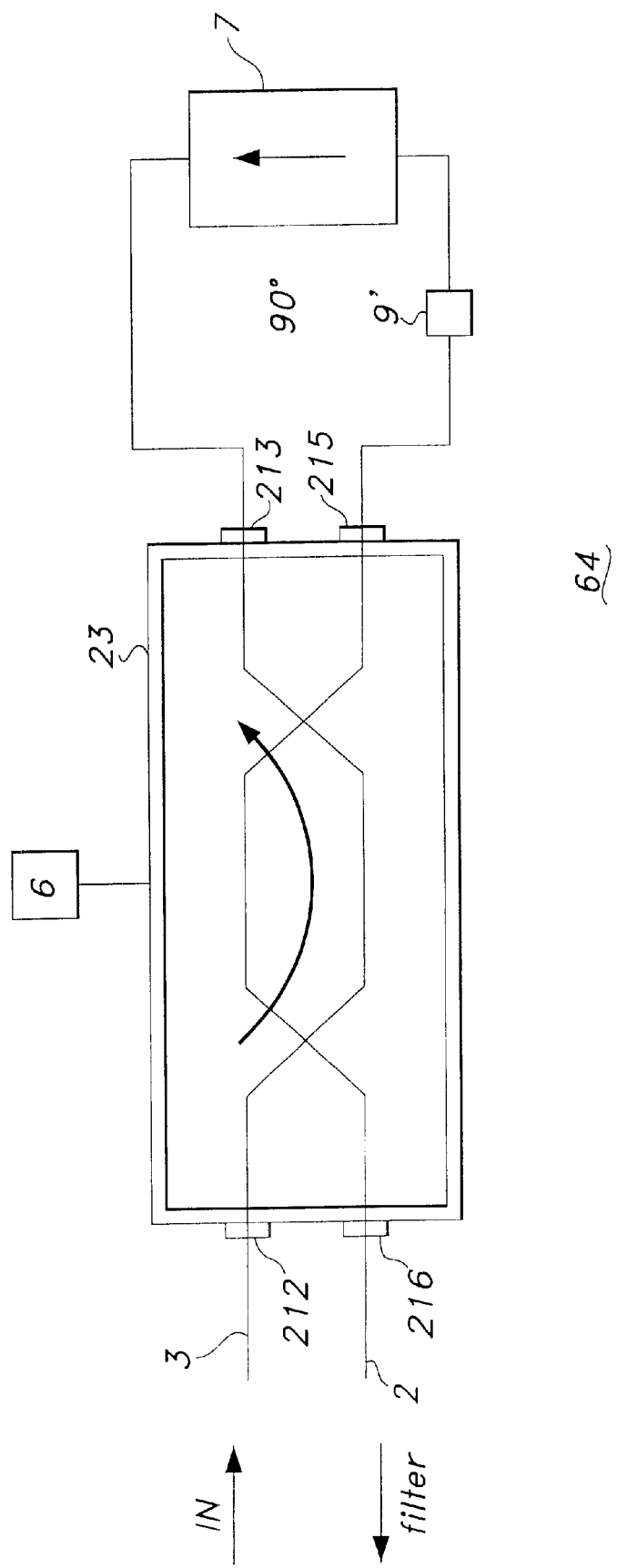
FIGS. 12 and 13 show schematically two devices according to another embodiment of the invention, each of which uses an acousto-optical device with a single converter.

FIG. 12 depicts a pass-band filter 64 comprising the single converter acousto-optic device 23. The input port 215 of this device is connected through a polarization controller 9' and an optical isolator 7 to the input port 213. The polarization controller 9' is adjusted in such a way to obtain, in the optical path between the port 215 and 213, a polarization rotation of 90°. This configuration performs a double pass of the light entering at the fiber 3, and it allows a compensation of the frequency acousto-optic shift. In this case, polarization control is added to obtain frequency shift compensation. For the compensation to hold for any wavelength, polarization-maintaining elements are inserted between port 215 and 213.

Figure 13:
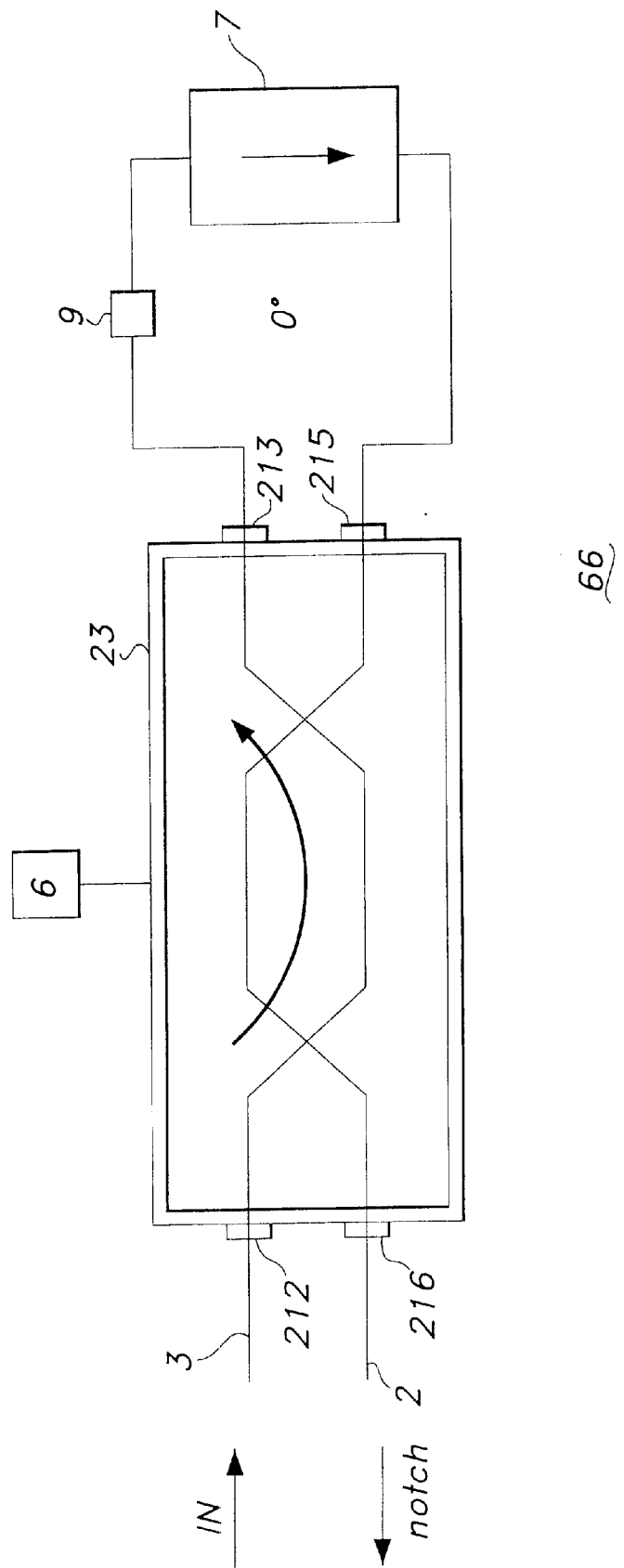

FIG. 13 shows a configuration 66 for performing a double-pass notch filter between fibers 3 and 2. In this case, polarization controller 9 realizes no polarization rotation in the corresponding optical path. In this case, no frequency shift issues are present (the notch light is unconverted). The polarization is then controlled for wavelength shift compensation that in this case is possible.

Figure 14:
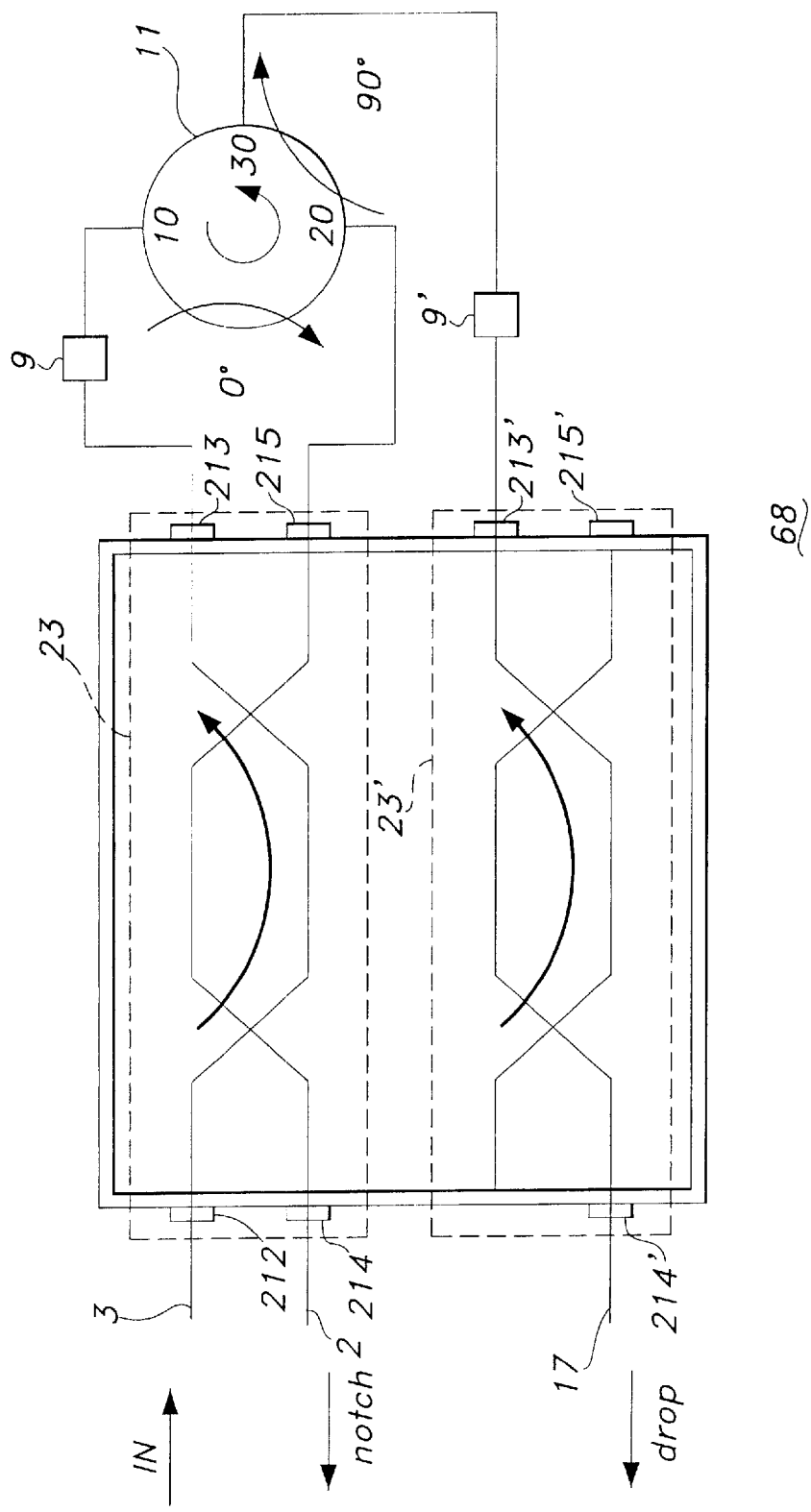
FIGS. 14 and 15 show schematically two devices according to another embodiment of the invention, each of which uses two parallel acousto-optical stages with a single converter.

FIG. 14 depicts a double-pass drop and notch filter 68 by using two acousto-optic filters 23 and 23' preferably manufactured on the same substrate and a three-port optical circulator 11. The polarization controllers 9 and 9' perform a polarization rotation respectively of 0° and 90° for the corresponding optical paths. For this device 68, fiber 3 connected to the port 212 is the input port of the device, fiber 2 connected to the port 214 is the notch output, and fiber 17 connected to a port 214' of the acousto-optic device 23' is the drop output. This configuration provides wavelength shift compensation for the notch output and frequency shift compensation for the drop output.

Figure 15:
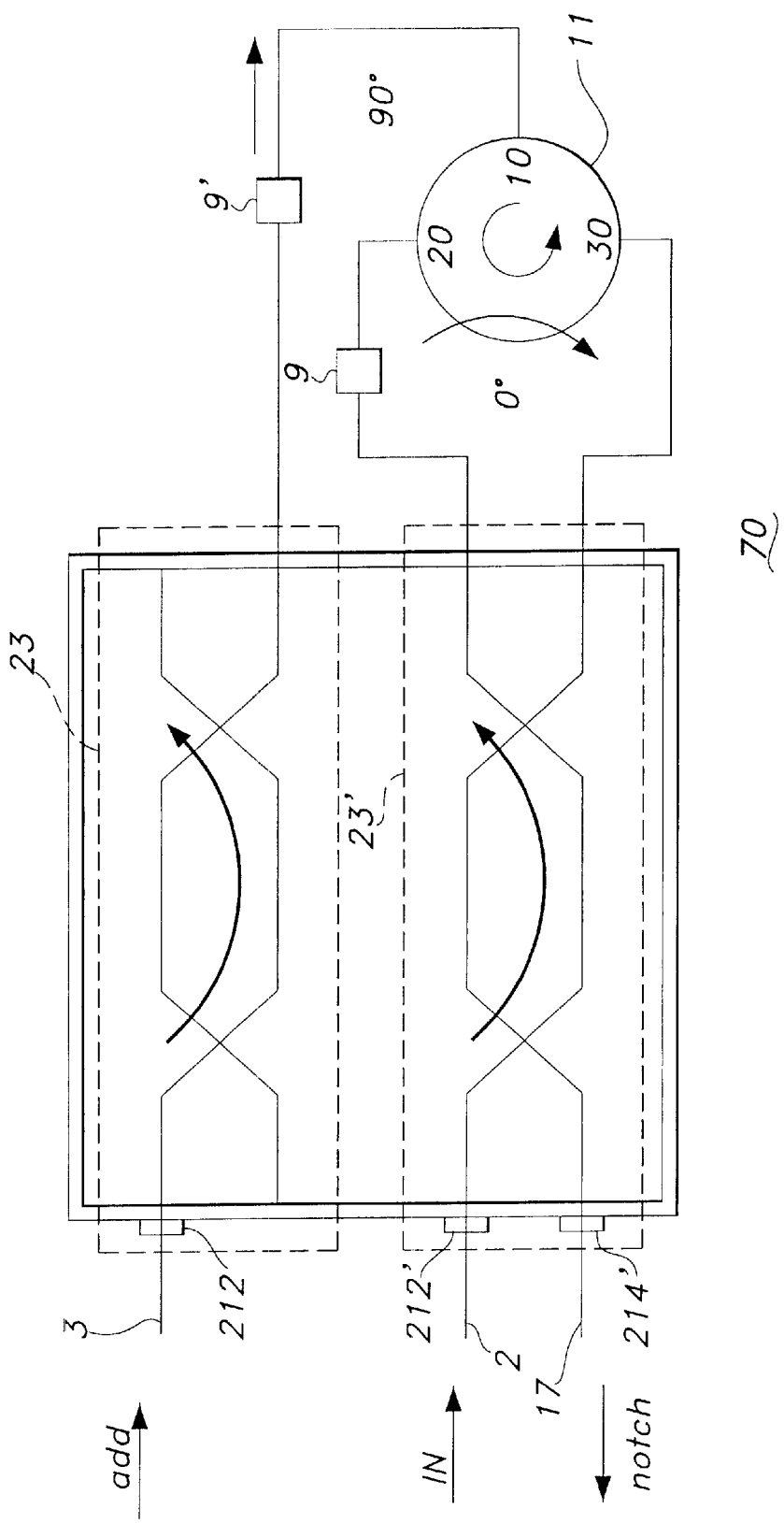

FIG. 15 shows a double-pass add and notch filter 70 analogous to device 68 of FIG. 14. More particularly, fiber 3 connected to the port 212 is the add input, fiber 2 connected to a port 212' is input port, and fiber 17 connected to a port 214' of the acousto-optic device 23' is the notch and add output. Like in FIG. 14, device 70 provides wavelength shift compensation for the notch output and frequency shift compensation for the add output.

Figure 16:
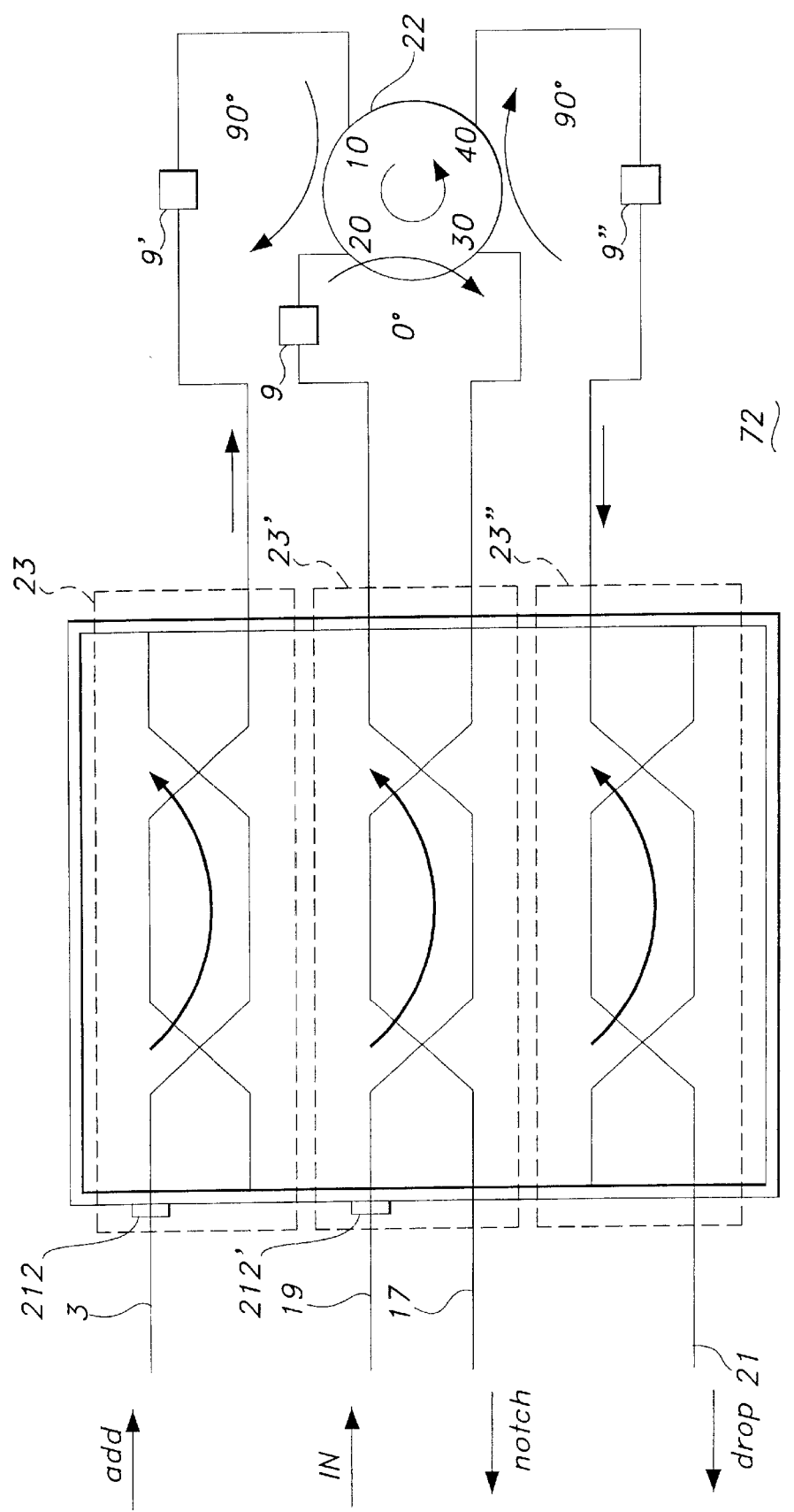
FIG. 16 shows schematically a device according to another embodiment of the invention that uses a device with three parallel stages with a single converter.

FIG. 16 depicts a double-pass add/drop filter 72 by using three acousto-optic filters 23, 23' and 23" preferably manufactured on the same substrate and a four-port optical circulator 22. The polarization controllers 9, 9', and 9" perform a polarization rotation respectively of 0° and 90° for the corresponding optical paths. In reference to FIG. 16, fiber 3 is the add input; fiber 19 is the input of the radiation to be filtered; fiber 21 is the drop output; and fiber 17 is the notch and add output. Device 72 of FIG. 16 provides wavelength shift compensation for the notch output and frequency shift compensation for the add and drop output.

Without polarization-maintaining elements, the polarization controllers provide the means for regulating polarization rotation and achieving compensation for each wavelength of operation. Polarization-maintaining elements in the rings on the backside of the filter allow compensation to hold for every wavelength, once the correct polarization rotations are set. Even without polarization control, that is without frequency shift compensation, the configurations are still quality solutions for double passage through the same device, where frequency shift is not an issue.

In the configurations described above, based on a device with a single converter, the converter can be made longer than in the configurations based on two separate converters. Such configurations are then capable of narrower bandwidths of the filtering curve compared with the configurations with two converters. Applicants have observed that for the devices depicted in FIGS. 14, 15, and 16, some variants are possible by replacing one or more polarization rotations of 90° for 0° and inverting a corresponding number of acoustic wave directions of propagation. For example, a variant of device 68 in FIG. 14 is obtained using an acousto-optic stage 23' having the transducer in such a position as to invert the acoustic wave propagating direction compared to the one shown in the FIG. 14 and by adjusting the polarization controller 9' to achieve a polarization rotation of 0°. In a similar fashion, for the devices 70 and 72 of FIGS. 15 and 16, it is possible to realize respectively one and three alternative embodiments.

The Applicants observe that further configurations are possible following from the symmetrical properties of the devices used and are easily deducible from the previous figures and the above-mentioned descriptions by those skilled in the art.

Further, Applicants note that the reinsertion of the optical signal in the same switch and the connection between the optical switches as described can be performed not only by means of optical fibers, but also with micro-optic technology. For example, the reinsertion optical path can be integrated on a semiconductor substrate suitably connected at ports 203 and 205 of the switch 8 of FIG. 1.

As previously described in reference to the device of FIG. 1, and also for the other configurations illustrated, the value of the rotation for each selected wavelength can be optimized independently by adjusting the position of the polarization controllers until the minimum passing bandwidth, or the maximum depth of the notch, is obtained on a suitable Optical Spectrum Analyzer. In addition, this adjustment step can be avoided by using, for the corresponding optical paths, fiber and devices (as the isolators and optical circulators) with polarization maintenance. In this case the overall rotation of polarization can be controlled setting appropriately the orientation of the fiber at the connection with the acousto-optic filters ports with no need of the polarization controllers. In this way, the set value of the rotation is maintained even for changes in the selected wavelength, with no need for re-optimization Among the advantages introduced by the present invention thereby include: (1) a configuration simplification shown by a single temperature control (no temperature difference between two stages), a single radio frequency control, reduction to half of the electro-acoustic transducers and of the radio-frequency power with respect to a double-stage device, less overall size, narrower bandwidth, and suitability for use as a filter with notch output and as add/drop; (2) capability of eliminating the frequency shift and the wavelength shift, if necessary, and performing an effective polarization independent device; and (3) capability of eliminating the frequency shift even when the radio frequency on the two converters is different.

Figure 17:
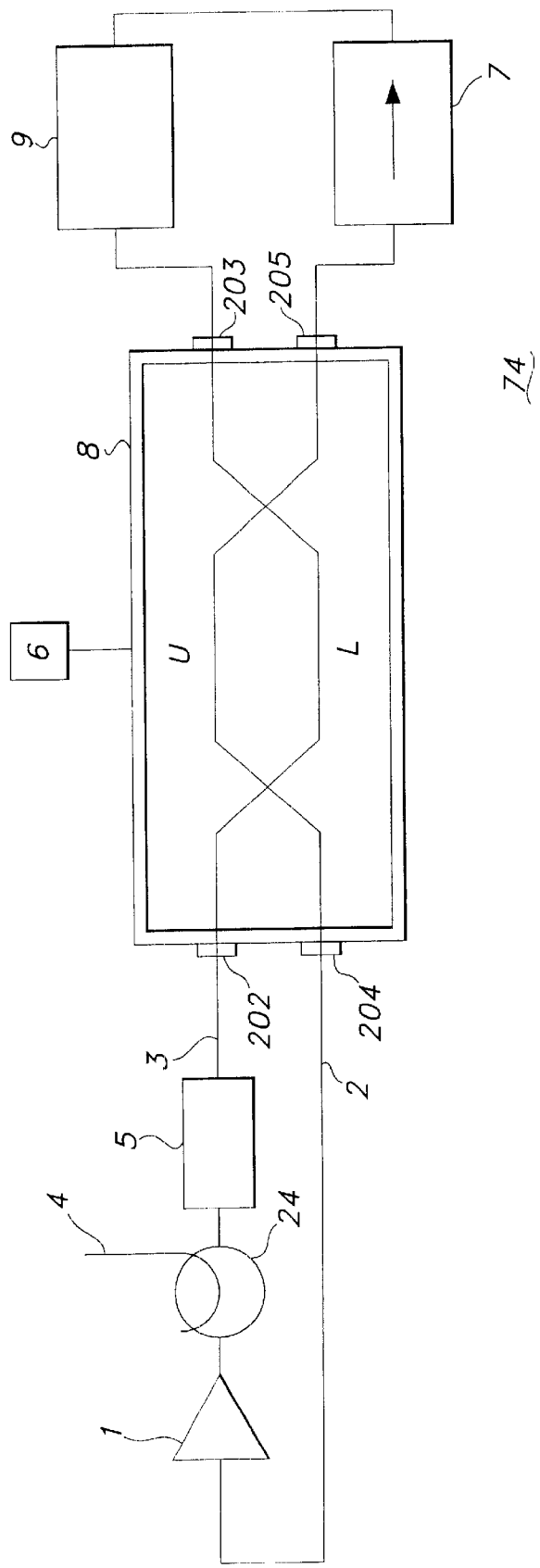
FIG. 17 shows schematically a laser according to another embodiment of the invention.

With reference to FIG. 17, a loop laser generator 74 tunable by means of a radio frequency will be described. Laser generator 74 shown in FIG. 17 comprises a doped fiber optical amplifier 1 having a port connected to an optical splitter 24 and another port connected to a portion of fiber 2. The optical splitter 24 is connected to an output laser fiber 4 and to a second portion of fiber 3. The second portion of fiber 3 is connected to an input of a first polarization controller 5 one of whose outputs is optically connected to a first input port 202 of an acousto-optical switch 8. This switch 8 is connected to radio-frequency generator 6. A first output port 205 of the acousto-optical switch 8 is connected to an optical isolator 7, whose output is connected optically to a second polarization controller 9. An output of the second polarization controller 9 is connected to a second input port 203 of acousto-optical switch 8.

A second output port 204 from acousto-optic switch 8 is connected to the first portion of fiber 2 leading to the input of the optical amplifier 1. A suitable doped erbium (Er) fiber optical amplifier may be, for example, the "Amplifos-OP 980 F" produced by the Applicants, or any equivalent apparent to those skilled in the art.

The other components of the laser generator shown in FIG. 17 are, for example, of the same type as those described previously and are therefore indicated by the same numerical references. The optical splitter 24 has, for example, a splitter ratio of about −20 dB (1% of the power outcoming the amplifiers is transmitted to the laser output fiber 4). Splitter ratio values different from −20 dB can be suitably chosen. Optical splitters suitable to be used in the device of FIG. 17 are known and as an example, made by "E-TEK."

The optical amplifying unit used by Applicant in the tested embodiment comprises input and output optical isolating elements along the optical path for the optical signals. Applicants have determined, however, that a laser according to the invention can be operated also with an amplifier unit having a single optical isolating (for example, an input or an output optical isolator). Alternatively the optical isolating element may be arranged external to the optical amplifying unit and coupled along the half-ring comprising the optical amplifying unit.

In the framework of the present application, an optical isolating element is a device that gives a loss to light propagating in one direction that is significantly greater than to light propagating in the opposite direction. In general the losses in the two directions must be large enough to reach a net loop gain in one direction only.

The operation of the laser shown schematically in FIG. 17 is as follows. The laser shown in FIG. 17 operates by supplying pumping light energy at a wavelength capable of exciting to a laser emission state the fluorescent dopant contained in the doped fiber (active fiber) of the amplifier 1. The dopant can decay to a base state from this laser emission state, with the emission of a light signal at a predetermined wavelength, either spontaneously or following the passage through the active fiber of a light signal having the same wavelength. This light signal is made to pass through the active fiber of the amplifier 1 a large number of times, owing to the configuration of the laser cavity, and is therefore amplified a number of times until it reaches a level sufficient to overcome the losses. An optical amplifier other than a fiber amplifier can be used, e.g., a semiconductor optical amplifier. As a result, device 74 generates a laser signal, or emission signal, which can be extracted at the output 4. The emission wavelength is controlled by means of the acousto-optical switch 8, which in turn is connected to the radio-frequency generator 6, and which by interacting with the polarization controllers 5 and 9 enables the radiation at the desired wavelengths to be amplified in the laser loop.

The phase of selection of the laser emission wavelength by means of the acousto-optical switch 8 shown in FIG. 17 will now be described in greater detail. The optical path leaving the second output port 204 of the acousto-optical switch 8, and comprising fiber 2, amplifier 1, fiber 3, and polarization controller 5, up to first input port 202, will henceforth be referred to as the "left-hand half-loop." The optical path leaving first output port 205 of acousto-optical switch 8, and comprising isolator 7 and polarization controller 9, up to second input port 203, will henceforth be referred to as the "right-hand half-loop."

In particular, we shall consider an embodiment of the invention in which the first polarization controller 5 is controlled in such a way that the left-hand half-loop does not, overall, introduce any rotation of the polarization of the incoming radiation. As well, polarization controller 9 is controlled in such a way that the right-hand half-loop also introduces no rotation. This particular embodiment will be referred to for the sake of brevity as a 0°-0° laser.

Figure 11:
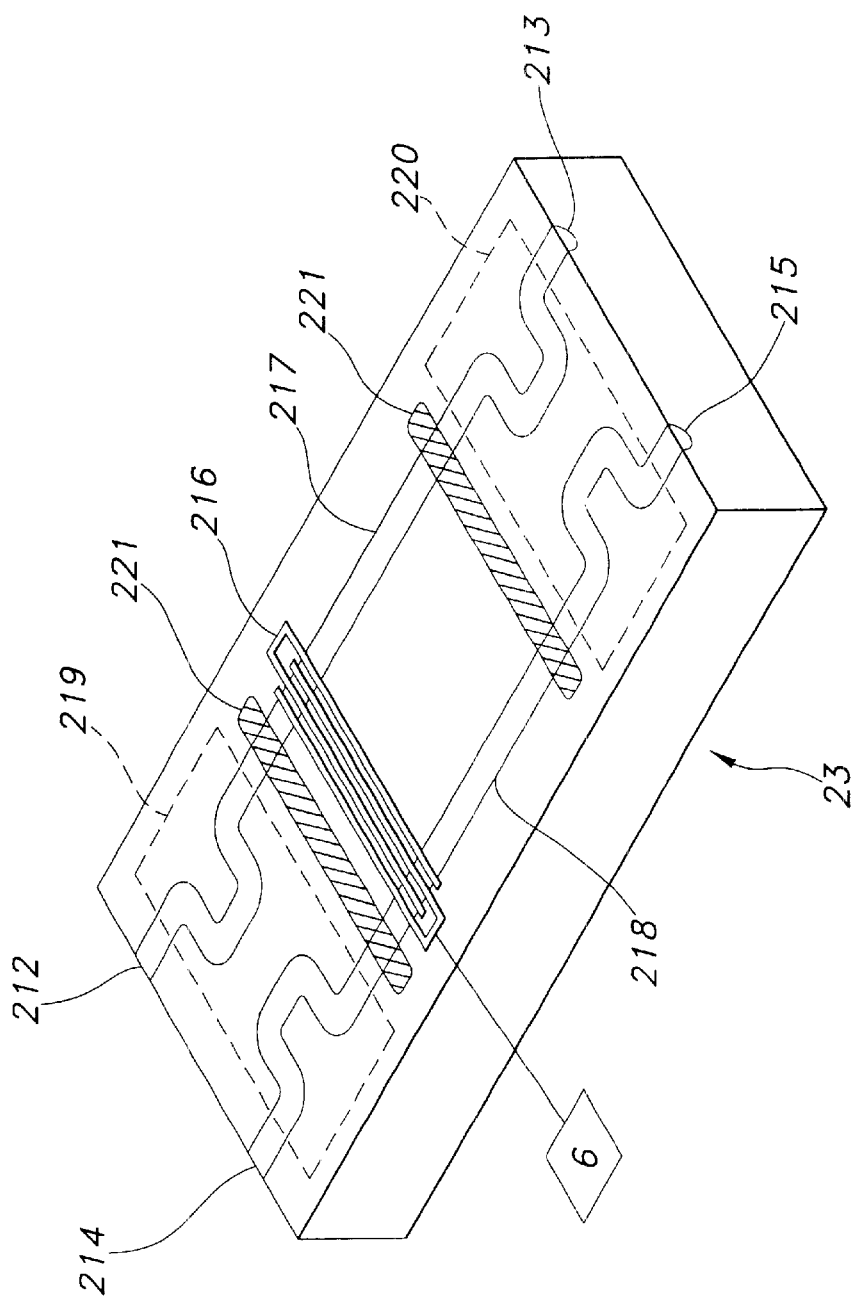
FIG. 11 shows an acousto-optical filter with a single converter.

The acousto-optical filter can be different from the acousto-optical switch 8 such as, for example, the device described with reference to FIG. 11.

Reference will be made to the laser device 76 of FIG. 18, which is similar to FIG. 17, but in which the degree of rotation of polarization introduced by the two half-loops (right-hand and left-hand) is expressly indicated. For clarity of description, reference will be made to a particular example for switch 8 as detailed in FIG. 2 in which the polarization dividers 104 and 105 are of the type for which the incoming TE polarization, from any of the optical guides 111, 112, 115, 116 and 113, 114, 117, 118, is transmitted along the optical waveguide corresponding to cross transmission (for example, for the divider 104, cross transmission is from 111 to 116), while the TM polarization is transmitted along the optical guide corresponding to bar transmission (for example, for the polarization divider 104: from 111 to 115). It will be evident to a person skilled in the art that this principle can be extended to the case in which the polarization dividers have the opposite behavior (bar transmission for TE polarization and cross transmission for TM polarization) to that described below.

When an appropriate selection signal is applied to the electrodes of transducers 123 and 124 of FIG. 2, switch 8 is switched to an on-state and changes to the cross transmission condition (cross-state) for the selected wavelengths. In this condition, input ports 202 and 203 are connected to the cross output ports, namely 205 and 204, respectively. For this purpose, transducers 123 and 124 generate two surface sound waves at radio frequency with a drive frequency $f_{RF}$ (approximately 174±10 MHz for devices operating at approximately 1550 nm and 210±10 MHz for those operating at approximately 1300 nm). This frequency corresponds to the resonant optical wavelength at which the polarization conversion TE–TM or TM–TE takes place for a wavelength of the radiation for which the selection is required.

As previously described, even if the transducers are fed with the same radio frequency, the converted wavelengths in the two converters are slightly different. For the acousto-optic conversion in fact holds the relation according to equation (1) above. For variations due to the fabrication process, the actual value of the birefringence is different in the two guides where conversion takes place for the two polarizations. With the sound wavelength (the radio frequency) the same, what results is a different conversion wavelength, $\lambda_U$ and $\lambda_L$ for the two converters, upper U and lower L. The difference $\Delta\lambda=|\lambda_U-\lambda_L|$ is normally in the order of 0.2 nm. The two converted polarizations are present then at the filter output with slightly shifted spectra, which normally causes a light widening of the overall filtering curve. In the case of a laser, for which the linewidth is much narrower, then the filter curve of the acousto-optic device is localized near its peak, and the presence of two oscillating wavelengths can be determined, one for each polarization, shifted by the $\Delta\lambda$ indicated before.

In the configuration which has just been discussed, the light radiation, after having passed through the left-hand half-loop without undergoing net changes in polarization, enters the first input port 202 and reaches the polarization divider 104. At this point, the TE and TM polarization components are separated and pass through the optical waveguide branches 116 and 115, respectively, and are then propagated into the acousto-optical conversion stage along the optical fibers 120 and 119, respectively.

The polarization components that have wavelengths different from that which is required to be the emission wavelength of the laser (selected by means of the radio-frequency generator 6) pass unchanged through the branches 120 and 119 of the conversion stage 108. These components are then sent into the polarization divider 105, where they are recombined. The radiation recombined in this way is sent in the waveguard 106 in such a way that it leaves the port 203 in unchanged form. The isolator 7 absorbs this radiation with non-selected wavelengths, transmitted from the port 203.

However, the TE polarization components present at the first input port 202, at the predetermined wavelengths, selected by the radio-frequency generator 6, are converted into the orthogonal TM polarization state along the optical waveguard 120. During this conversion the TE electromagnetic radiation is propagated in the opposite direction to that of the sound wave generated by the electro-acoustic transducer 124 and therefore, as shown in Table 1, it undergoes a frequency shift of the light which has a negative sign, $\Delta f_L = -f_{RF}$.

The TM radiation resulting from the conversion is transmitted by polarization divider 105 to optical waveguard 118 (bar transmission) and then, through optical guide 107, to first output port 205 of acousto-optical switch 8. First, consider the optimized condition. Radiation passes through isolator 7 and polarization controller 9 without undergoing a net change of its polarization state. This TM radiation is reintroduced into acousto-optical switch 8 through second input port 203. This radiation with TM polarization is sent by optical fiber 106 to polarization divider 105. Divider 105 transmits it from optical waveguard 117 to waveguard 114 from which it is propagated along optical fiber 119 in the opposite direction to that of the propagation of the sound waves generated by electro-acoustic transducer 123. This acousto-optical interaction results in the TM-TE conversion and a positive frequency shift of the light having a value of $\Delta f_U = f_{RF}$. To summarize, the TM radiation entering the polarization controller 5 has undergone, in this pass through the laser loop, an overall frequency shift of:

$$\Delta_{tot} = \Delta f_L + \Delta f_U = -f_{RF} + f_{RF} = 0, \quad (6)$$

and is present at the second output port 204 as radiation with TE polarization.

From here, the TM radiation passes through the left-hand half-loop again, passing through the optical amplifier and the polarization controller 5, and is reintroduced into the acousto-optical switch 8 at the input port 202 without having undergone a net change of polarization. Overall, therefore, during the phase of selection of the emission wavelength of the laser no frequency shift is introduced for each double pass of the radiation through the filter.

Figure 19:
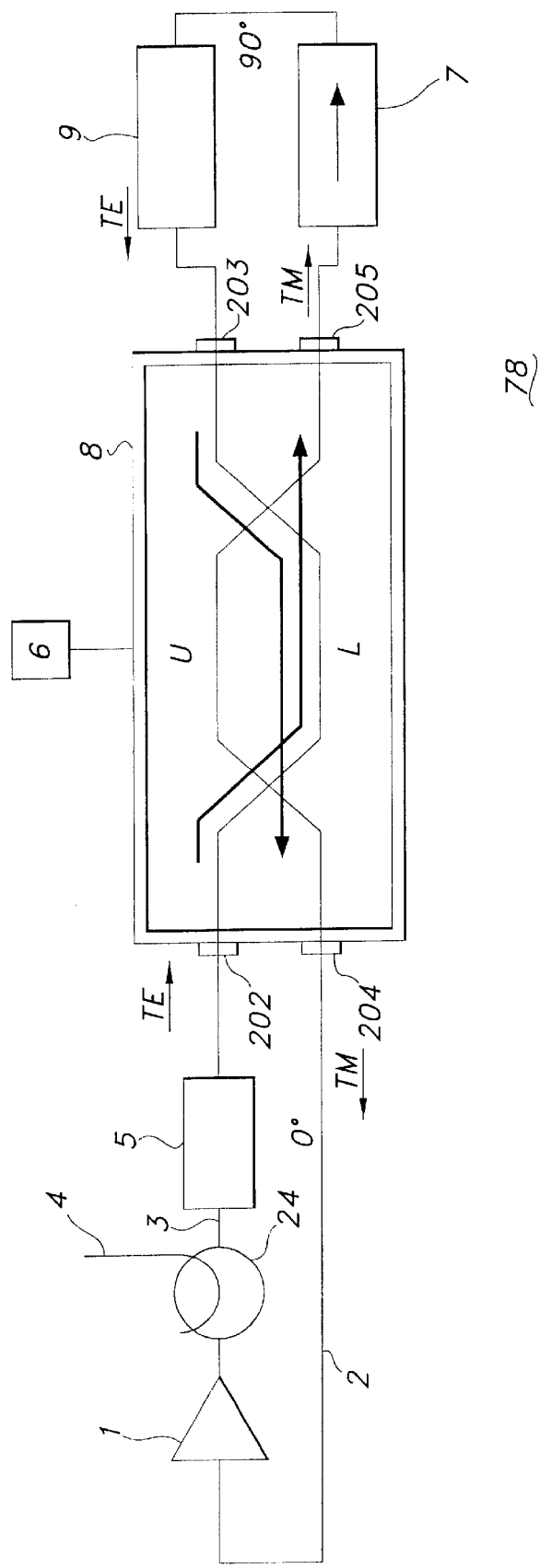
Figure 20:
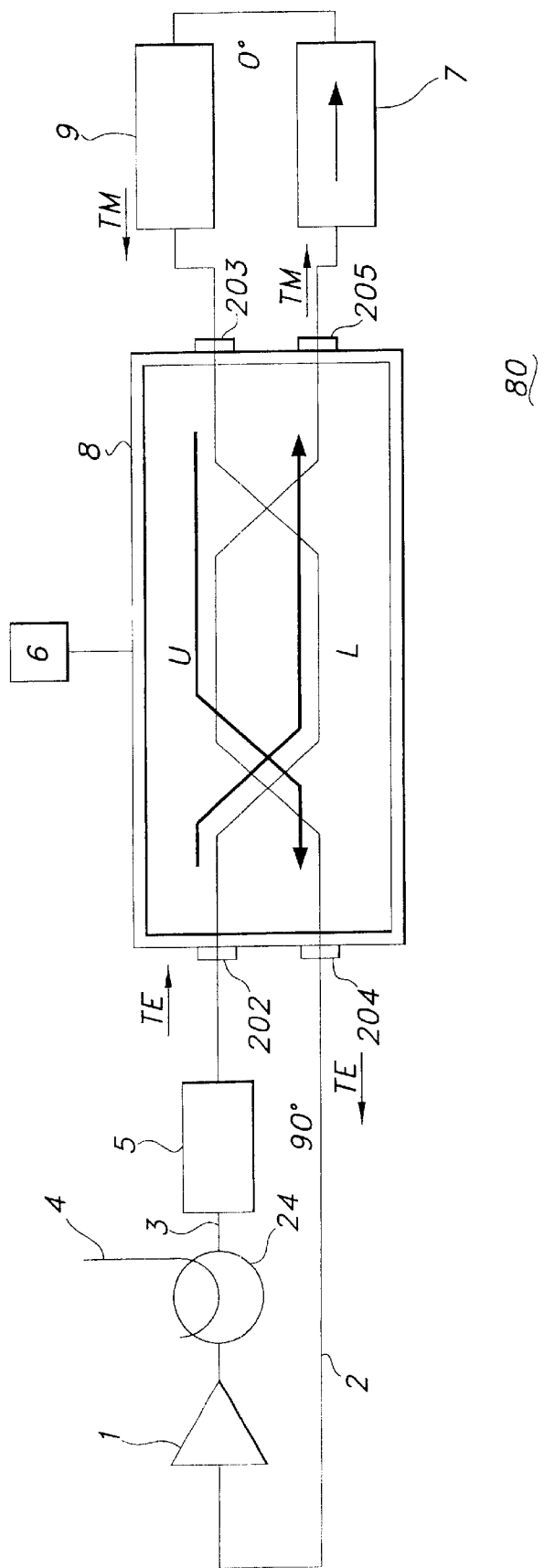
Figure 21:
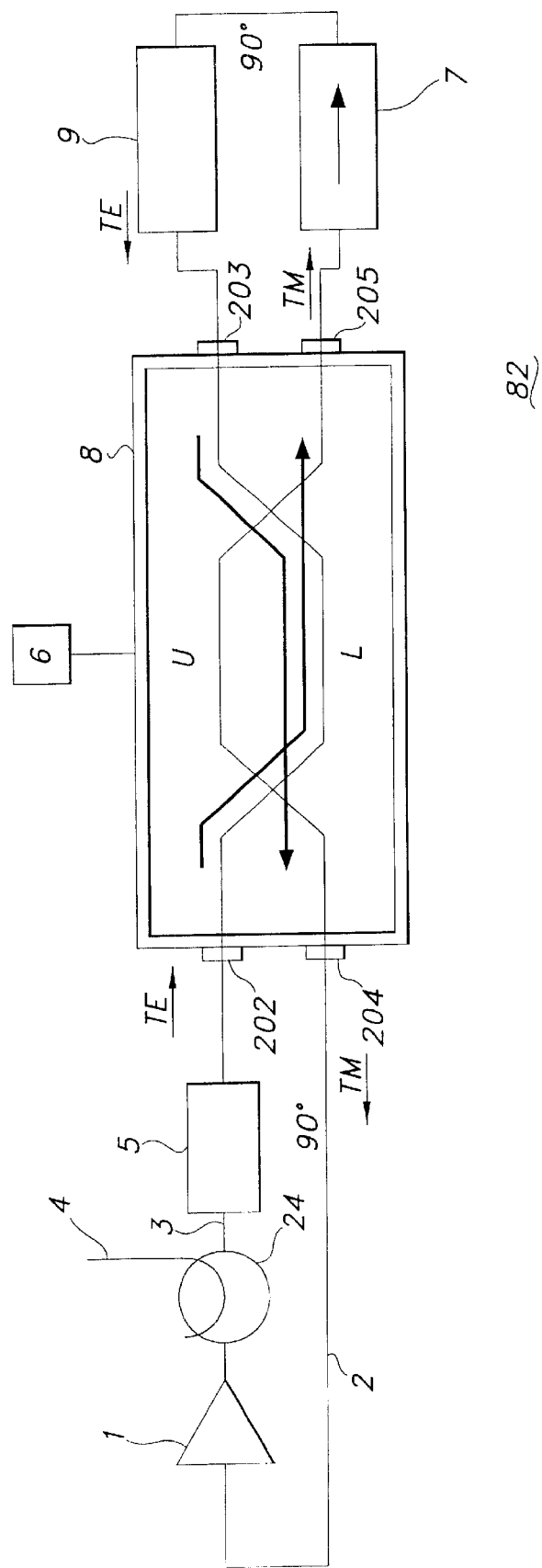

Further embodiments of the invention are shown in FIGS. 19, 20 and 21. According to another embodiment, with reference to FIG. 19, the left-hand half-loop, comprising polarization controller 5, does not introduce any rotation overall for laser device 78, while the right-hand half-loop, comprising polarization controller 9, introduces a rotation of 90° overall. This embodiment will be referred to for brevity as a 0°-90° laser. The operation of this laser is similar to that of the 0°-0° laser described above, and will be evident to a person skilled in the art.

With this configuration, when a TE type radiation enters first polarization controller 5, there will be TE type radiation at second output port 204 of acousto-optical switch 8, with a zero frequency shift after two passes through the laser loop, i.e., two double passages through acousto-optical switch 8.

FIG. 20 shows a laser configuration 80 of the 90°-0° type, that is, one in which the left-hand half-loop introduces a rotation of 90° overall and the right-hand one introduces a rotation of 0° in the polarization. With this configuration, when a TM type radiation enters polarization controller 5, there will be TM type radiation at second output port 204 of acousto-optical switch 8, with a zero frequency shift after two passes through the laser loop, i.e. two double passages through acousto-optical switch 8.

Figure 18:
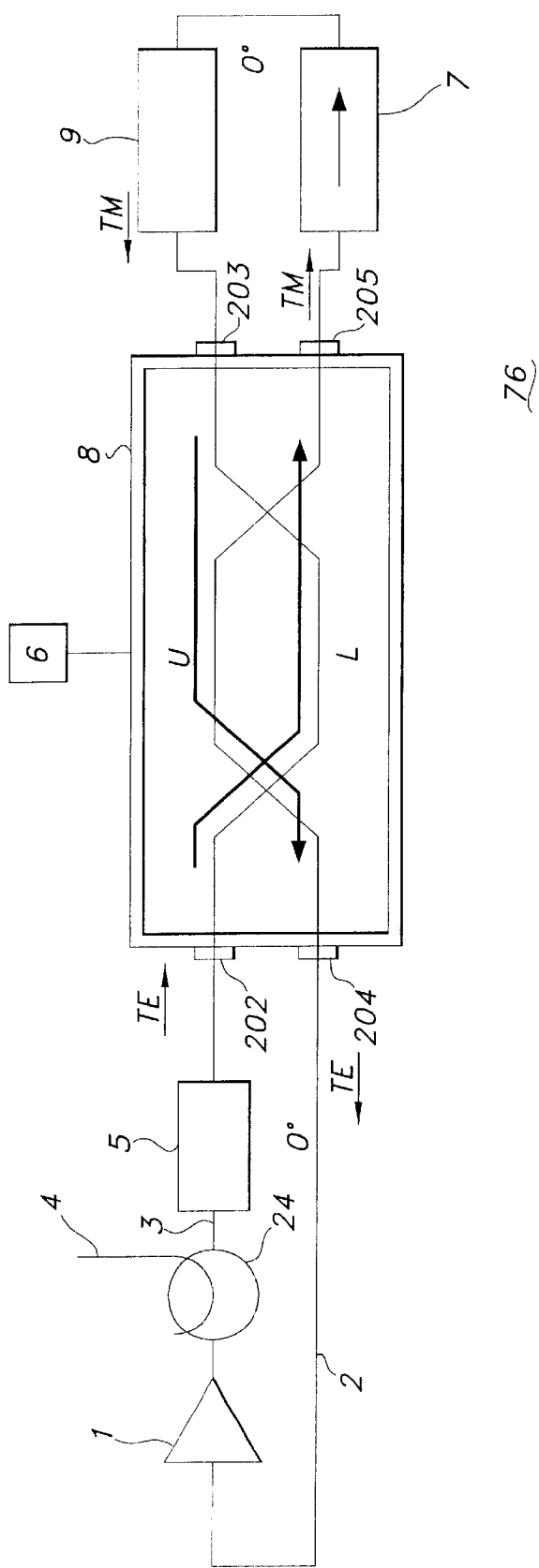
FIGS. 18, 19, 20 and 21 show schematically four different configurations of a laser according to other embodiments of the invention.

The configurations described in FIGS. 18–20 force light to pass alternatively through the two converters U and L. The overall filter characteristic therefor becomes the product of the two filter characteristics, shifted by $\Delta\lambda$ of the two polarizations, and will therefore become the same for the original TE and TM light. These configurations completely compensate even for the converted wavelength shift $\Delta\lambda$ between the two polarizations, allowing laser oscillation just on a single line, the same both for TE and TM polarizations.

For the particular embodiment of device 82 shown schematically in FIG. 21, both the right-hand and the left-hand half-loops introduce a rotation of 90° overall in the polarization of the radiation passing through them, giving a 90°-90° laser configuration. As may be easily seen from FIG. 21 and from what has been stated previously, this again makes it possible to obtain full compensation of the frequency shifts after a complete pass through the laser loop, in other words a double passage through acousto-optical switch 8.

On the other hand, in the arrangement 82 of FIG. 21 each polarization passes always through the same converter, so the wavelength shift is not compensated. Applicants have observed that the configurations relating to FIGS. 19, 20, and 21 are suitable to compensate the frequencies shifted due to the acousto-optic interaction also when the radio frequencies of transducers 124 and 123 are different.

The present invention introduces numerous advantages over the prior art. The Applicants have observed that the compensation of the frequency shift introduced in the acousto-optical interaction takes place in a precise way in the laser according to the invention in the embodiments shown in FIGS. 18–21. In fact, the passage of light in the converters U and L takes place more than once and with directional characteristics which ensure that each of the two polarizations has the same number of shifts, which have values equal to the acoustic frequency but of opposite sign.

The device according to the invention has all the advantages deriving from the double passage performed by the filter and listed before. By eliminating the frequency shift, stable laser oscillation is achieved. The sum of frequency shifts, at any round of the light signal in the laser ring, may cause the signal spectra to move in a region of the amplifier gain that does not enable the laser operation.

Applicants have found experimentally that when the components (e.g. all the fibers, optical amplifier 1, isolator 7, optical splitter 24) in the left and right half-rings are not polarization maintaining, polarization rotation does not remain optimized as the wavelength is changed. This is due to the dispersion properties of the material of the optical fiber. The change in the refractive index leads to a change in the way the fiber rotates the polarization. This determines, as the laser is tuned, a periodical splitting of the single-line spectrum in a double-line spectrum, and competition between the two polarizations leads to irregular periodical variation of the tuning curve from the ideal one, as will be shown below.

Figure 22:
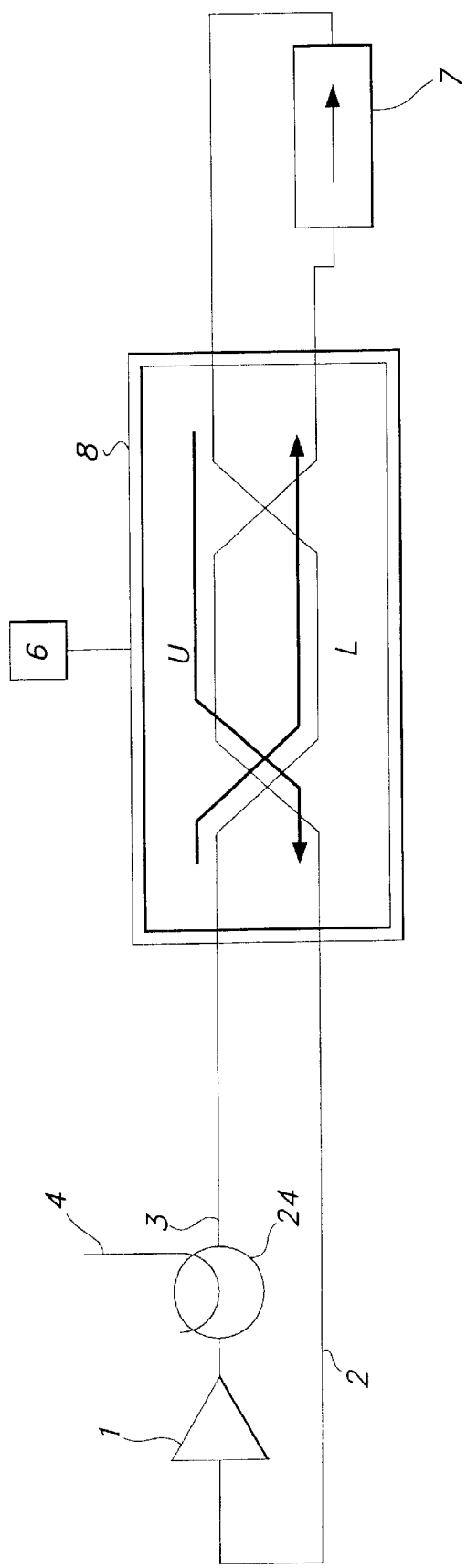
FIG. 22 shows schematically a laser according to another embodiment of the invention that uses polarization-maintaining fibers.

Polarization-maintaining fibers and components (for example, optical amplifier 1, isolator 7, optical splitter 24) should avoid such an occurrence. Polarization-maintaining optical splitters are available, for example, from E-TEK. Polarization-maintaining active fibers for optical amplifier 1 are available, for example, from Lucent Technologies. In such a realization, represented in FIG. 22, there is no need for polarization controllers. The desired polarization rotation in the two half-rings can be obtained simply by proper choice of the orientation of the fiber at its connections with the waveguides of the integrated filter.

The acousto-optic switch 8 can be set to select more than one wavelength simply by applying the corresponding set of radio frequencies. Thus, in the laser ring more than one wavelength can be selected, and each of the selected wavelengths can be tuned independently from the others. With the configurations proposed, it is then possible to select and independently tune multiple lines for the laser oscillation. The effective continuous oscillation of the laser on the multiple lines depends only on the gain characteristics of the optical amplifier. With a suitable gain behavior in the wavelength range of interest, the laser could then act as a multi-line source, in which each laser line is tuned independently from the other ones.

The acousto-optic filter itself can add multi-wavelength oscillation. For example, the transmission of each of the selected wavelengths can be varied, by varying its radio frequency power, to equalize the net gain for the wavelengths. The equalization should then be controlled during the tuning of each wavelength.

Applicants have constructed a laser according to the disclosed invention and have conducted experimental tests, which are reported below.

Experimental tests:

A laser as shown in FIG. 17 was constructed, in which it was possible to change the rotation of polarization introduced into the two half-loops by means of the polarization controllers 5 and 9. The tests were repeated for three samples of acousto-optical filters PIRAOS-150 X. These samples are named S1, S2, and S3. The other devices used were those specified previously. In particular, the optical isolator was such that it introduced losses of 34 dB for radiation at wavelengths not selected by switch 8.

The laser loop had the following structural characteristics: estimated length of loop 20 m; measured losses in the loop 15 dB (without Er losses); and output coupling −21.6 dB (0.7%). The acousto-optical device was optimized to operate at a temperature of 40° C.

As a result of measurements with a power meter, the following power characteristics of the laser source were noted: laser output power; −10 dBm (0.1 mW); and estimated power in the cavity; 11.6 dBm (14.5 mW). The time characteristics were measured by connecting a photodiode detector for the 15 GHz band to the output fiber 4, followed by an electrical spectrum analyser and an oscilloscope. The emission was observed continuously, with polarized light. Random amplitude modulations of the output signal were observed, which were presumably due to instability in the laser loop.

The spectral characteristics were evaluated with an optical spectrum analyser and a scanning Fabry-Perot filter. The laser source according to the invention was made to oscillate in a number of modes, with rapid jumps between groups of modes. The oscillation band was found to have a width of approximately 4 GHz, while the width of each individual line was 60 MHz.

Figure 23:
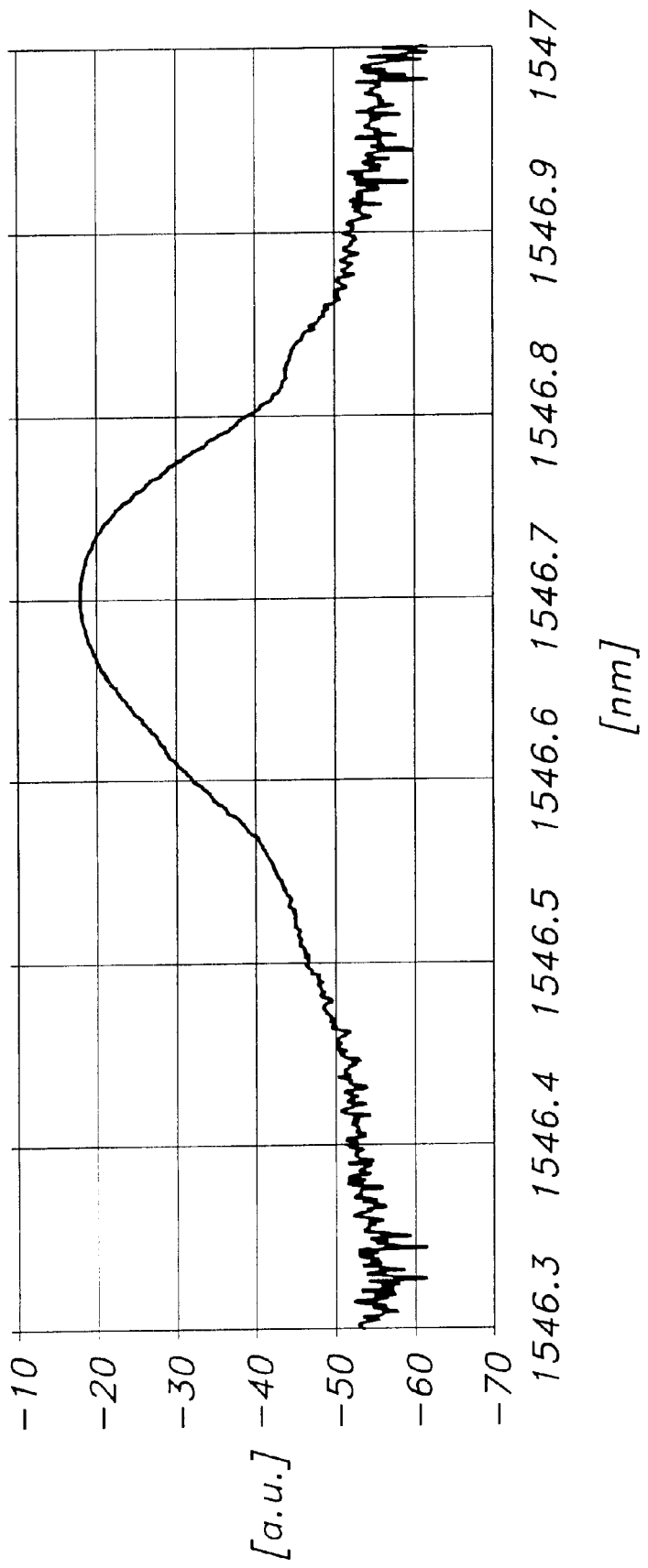
FIG. 23 is a diagram of the emission spectrum of a laser according to the invention that uses a PIRAOS-150 X acousto-optical filter.
Figure 24:
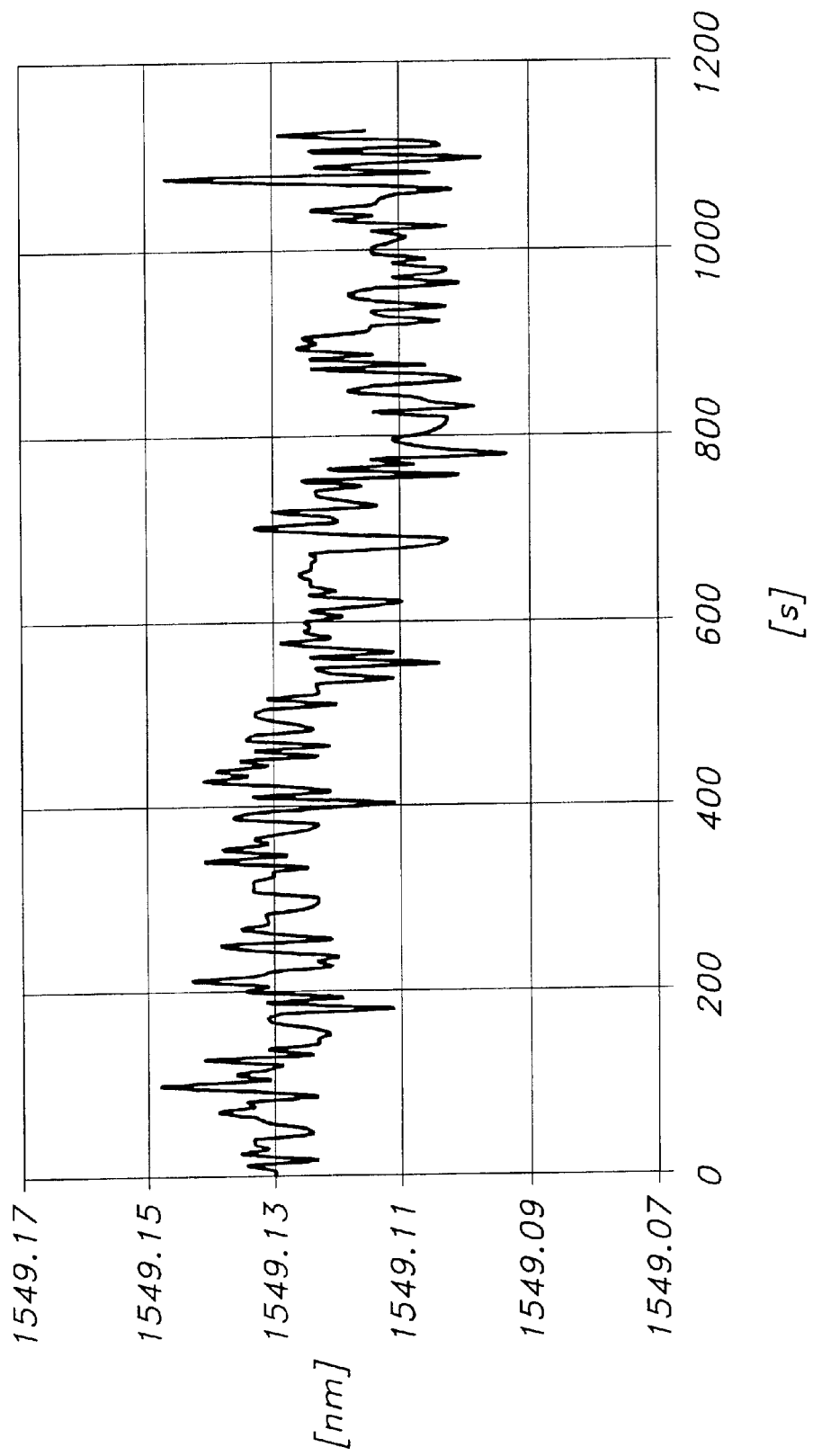
FIG. 24 is a diagram of the variation in time of the emission peak of a laser according to the invention.

FIG. 23 shows the envelope of the oscillating peak measured with an optical spectrum analyser (OSA). The wavelength of the peak varies with time, oscillating within a range of approximately 0.15 nm, which corresponds to a variation with time of the conversion frequency of approximately 20 kHz, as can be seen in FIG. 24. Those can be considered good stability characteristics. The stability of the emission peak appears to depend on the variation of the polarization along the optical paths that lead from the second output port 204 to the first input port 202 and from the first output port 205 to the second input port 203. Therefore, stability appears to be related to the state of the two polarization controllers 5 and 9.

Applicants have observed that for certain conditions of the polarization controllers 5 and 9 the peak appears as described (stable condition). When the state of even one of the controllers is changed, the shape of the peak becomes irregular and two distinct peaks, approximately 0.18 nm apart, take shape (less stable condition; shown in FIG. 25). By varying the state of the controllers, it is possible to change in a regular way from the one-peak to the two-peak condition.

Figure 26:
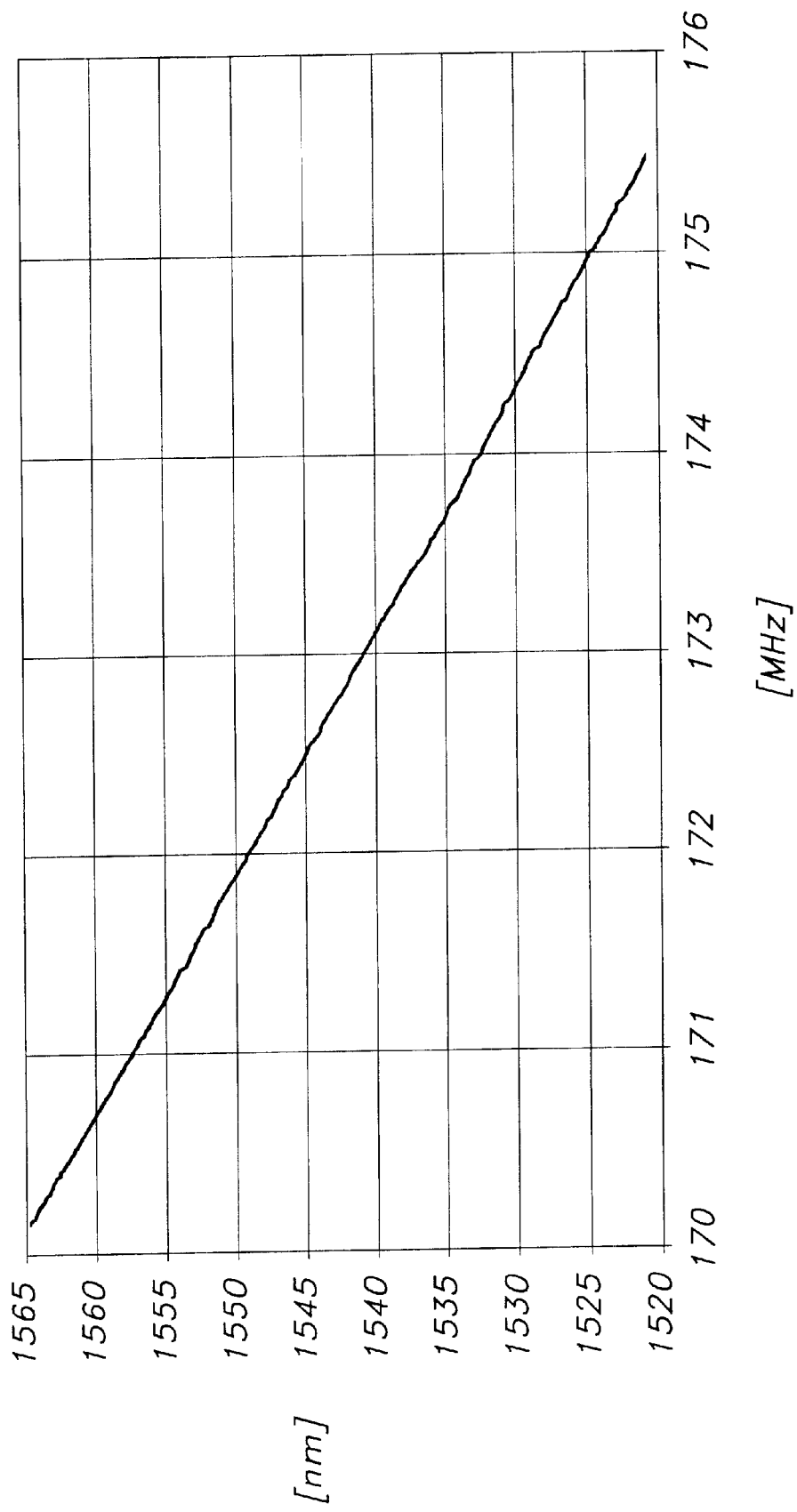
FIG. 26 is a diagram of the tuning curve of a laser according to the invention, showing the emission wavelength as a function of the acoustic frequency.

Measurements were also made in order to evaluate the tuning characteristics of the laser source. A typical tuning curve obtained by varying the radio frequency in the PIRAOS-150X acousto-optical switch 8 is shown in FIG. 26.

Figure 27:
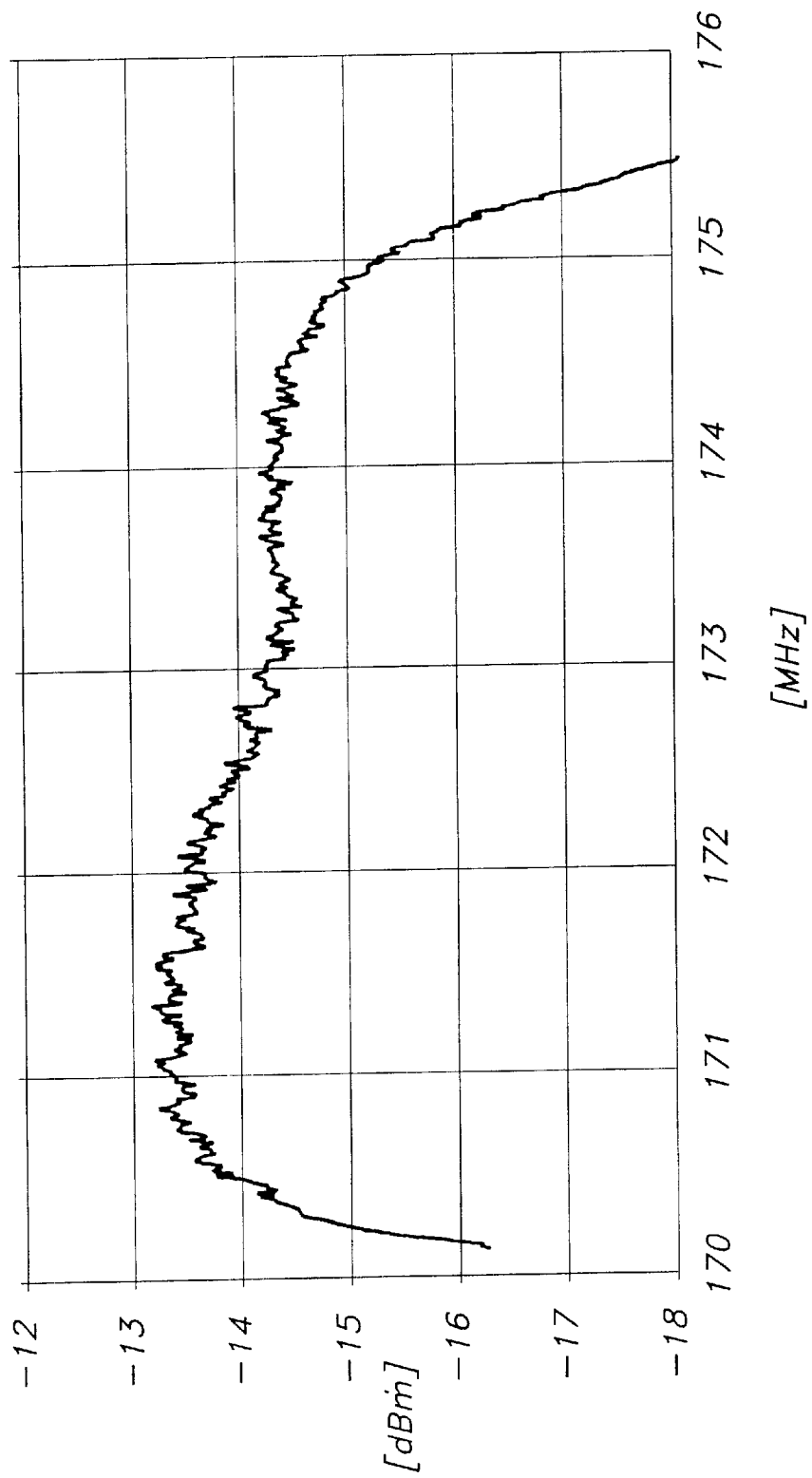
FIG. 27 is a diagram of the total emission power of a laser according to the invention during the tuning.

FIG. 27 shows the corresponding variation of the output power of the laser. The laser was found to be continuously tunable throughout the gain band of erbium (namely from 1522 nm to 1565 nm), in other words throughout the gain band of the dopant of the active fiber of the amplifier 1, but any extension to larger bandwidths is possible. The theory of polarization conversion by acousto-optical interaction predicts an inverse relationship between the acoustic frequency and the conversion wavelength. Applicants have observed experimentally that the variation of the emission wavelength as a function of the acoustic frequency can in fact be interpolated satisfactorily from a curve of the type:

$$\lambda = \frac{A}{f_{ac}} + B \tag{7}$$

The values of the constants A and B appear to depend slightly on the acousto-optical device used and they are always nearly the same. Table 2 below shows the values found for the two constants using the three samples of the acousto-optical filter PIRAOS-150X, S1, S2, S3:

TABLE 2

| Type of filter | A [MHz × nm] | B [nm] | Standard deviation of the residue |
|---|---|---|---|
| S1 | 245651.2 | 120.8653 | 0.089 |
| S2 | 244130.7 | 136.597 | 0.087 |
| S3 | 244924.8 | 130.9938 | 0.109 |
| mean | 244902.2 | 129.4854 | 0.095 |
| standard deviation | 760.5012 (0.31%) | 7.973592 (6.16%) | 0.012 (12.6%) |

The standard deviation of the residue signifies the standard deviation (root mean square) of the difference between the measured values and the values on the theoretical curve. The deviation of the experimental data from the interpolation curve, shown in FIG. 28, represents the "non-ideality" of the tuning process for the device in question in which the S2 filter has been used.

It was noted that, when the radio frequency varied, while the wavelength of the peak was shifted, there was a progressive loss of stability of the peak, which could be recovered by re-optimizing the state of the polarization controllers. Attention was focused on the curve of the deviation of the tuning process from the ideal case. This condition is shown as a function of the emission wavelength in FIG. 28.

Figure 28:
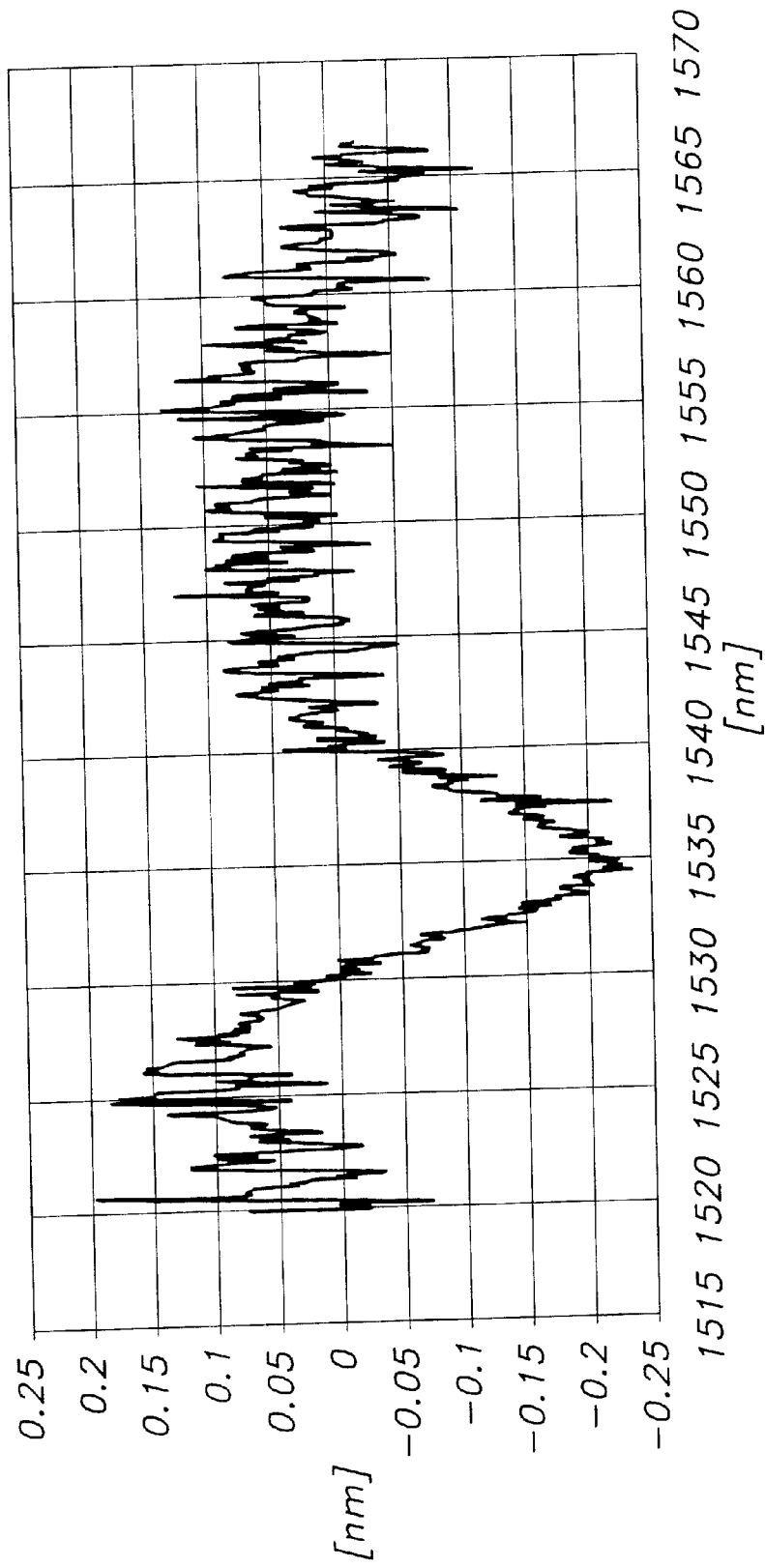
FIG. 28 is a diagram of the deviation of the tuning characteristic of a laser according to the invention, found experimentally by the theoretical interpolator.

In FIG. 28, it is possible to distinguish two superimposed "disturbances"; a slow variation (of the order of 15 nm); and a fast variation (from 2 nm to less than 1 nm) and very irregular trend. The slow variation is due to the fact that the erbium gain curve is not flat, but has a peak and a small dip. The product of the gain curve and the filtering curve determines the emission wavelength. In the resulting curve, the peak is shifted further with respect to that of the filtering curve as the slope of the gain curve increases at the peak (the peaks of the gain curve "attract" the oscillation peak). When passive filters are introduced into the loop, the shape of the gain curve changes and the trend of the long-term modulation follows the variations as expected. It therefore appears that this component of the deviation from the ideal tuning curve is intrinsic to the emission process and that correcting the shape of the gain curve can eliminate it.

The fast variation appears to be related to changes in the polarization of the light in the loop. As described above, the devices of FIGS. 18, 19, and 20 allow achieving no wavelength difference between the two polarizations. Applicants have determined that these three configurations are those corresponding to the most stable condition of the laser, the one with only one emission peak shown in FIG. 23.

Figure 25:
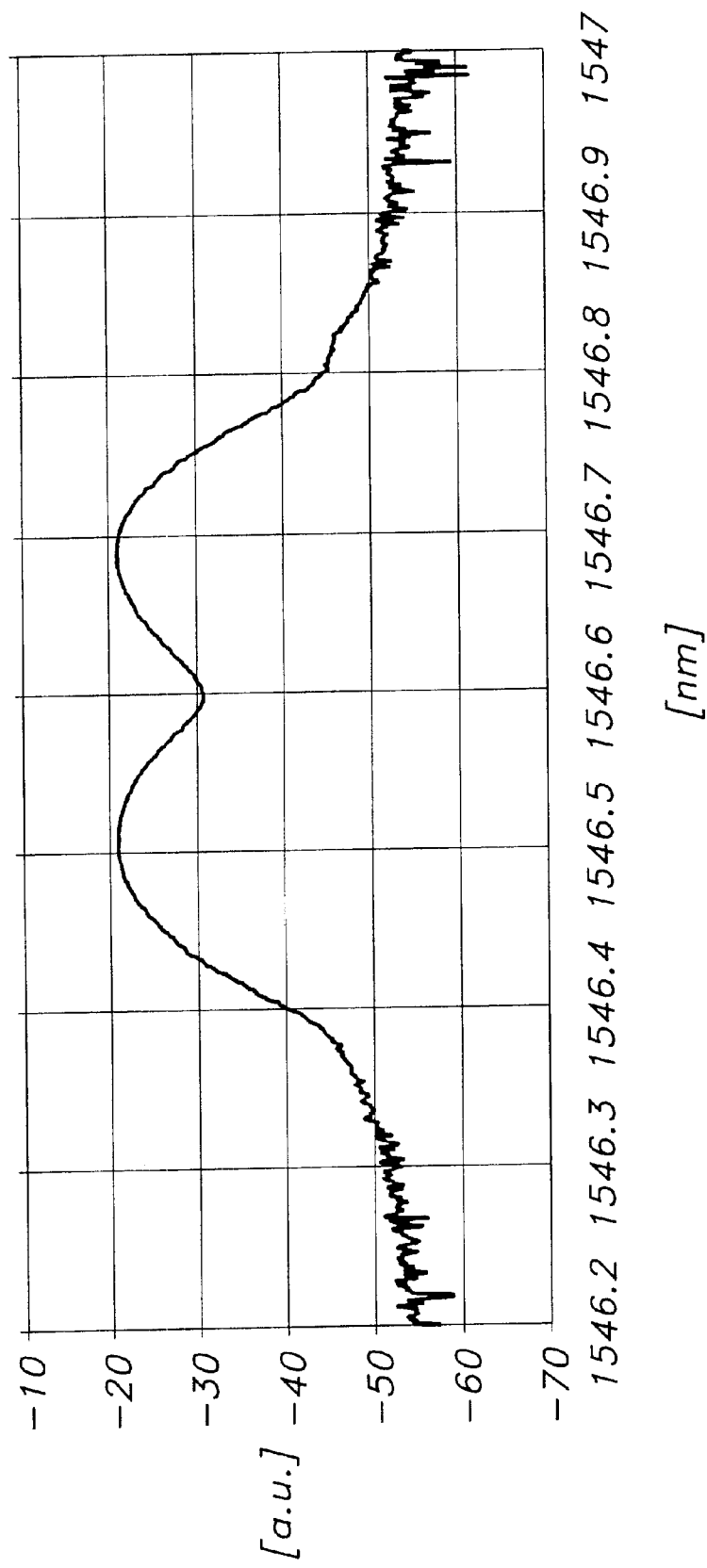
FIG. 25 is a diagram of the emission spectrum of a laser according to the invention in the less stable condition.

In the fourth configuration, depicted in FIG. 21, each polarization is converted twice in the same converter, so that the filtering curves for TE and TM appear shifted. This configuration appears to be associated with the less stable condition, with two separated emission peaks, as shown in FIG. 25. As to the tuning characteristic, the existence of the wavelength shift for certain polarization configurations and the dispersion properties of the common fibers is responsible for the periodic variation shown in the deviation curve of FIG. 28.

As the laser is tuned, i.e. the wavelength selected by the acousto-optic device is changed, the polarization rotation in the two rings of the laser structure is changed, due to refractive index changes in the fibers. The configuration then gradually changes and wavelength shift between polarization components is introduced, resulting in the modulation of the tuning curve. The modulation is due to the progressive hopping of laser wavelength from one line to the other corresponding to the two different polarizations as the shift is introduced. The periodic nature of the modulation is due to restoring of the initial polarization condition as the deviation of polarization rotation approaches 360°.

As can be easily understood, this periodic modulation could be avoided if the two half-rings are designed not to change globally the state of polarization of light when wavelength is tuned. This can be obtained by using all polarization-maintaining fibers, which do not show polarization effects as wavelength is changed, both with a polarization-maintaining optical amplifier, optical splitter, and isolator. All these devices are readily available to those of skill in the art, and the configuration can be effectively set up.

With both half-rings built by polarization-maintaining elements, the laser is expected to operate in the most stable condition, in any of the configurations: 0°-0°, 0°-90°, 90°-0°. However, stable operation and elimination of the fast variation in the tuning curve could be reached also with only the right-hand half-ring being polarization maintaining. The left-hand half ring can be left without polarization control, provided the right-hand one gives an overall polarization rotation of 0°. In this case, the laser oscillates, as tuned, between configurations 0°-0° and 90°-0°. These configurations, as previously described, both provide no wavelength shift and thus give a stable emission condition (single peak).

However, in the 0°-0° configuration one passage of light in the ring (double passage through the switch 8) is required for a round trip, while in the 0°-90° configuration, two passages are necessary. The laser then shifts between conditions with different numbers of round-trip passages. Because of this, the embodiment with the polarization maintenance only in the right-hand half-ring is expected to be slightly less stable than the one with polarization maintenance on both half-rings. Polarization rotation of 90° in the right-hand half-ring together with no polarization maintenance in the left-hand one, is less preferred because it could lead to a 90°-90° configuration and to instability.

To summarize then, progressively improved embodiments of the present invention provide numerous advantages compared with conventional arrangements and include: (1) no polarization control in the two half-rings, which provides good tuning performance of the laser but can generate periodic instability (two peaks) and periodic "fast" modulation of the tuning characteristic; (2) polarization maintenance only in the right-hand half-ring with polarization rotation of 0°, which provides good tuning performance with no periodic "fast" modulation of the tuning curve, but not complete stability; and (3) polarization maintenance in both half-rings, with configuration 0°-0° or 0°-90° or 90°-0°, which provides good tuning performance with no periodic "fast" modulation of the tuning curve and high laser stability.

Applicants have measured the tuning deviation curves for the laser with the S1 and S3 filters. The behavior of the various acousto-optical filters used appears to vary only in the amplitude of the maximum deviations (but in a limited way) and in the interval of the periodicity of the highest peaks in the fast variation. As it has been seen, these differences could be attributable to the different value of the wavelength shift of the light converted in the two polarization conversion regions.

To improve the laser performances, some directions can be followed. First, the laser gain curve can be flattened, by using special active materials or optical flattening filters.

Second, the stability can be improved by reducing the discontinuities at the fiber-filter and fiber-fiber connections, in order to reduce back reflection at the connections. Third, the cavity length can be reduced, to allow a lower number of longitudinal modes to be activated. Also, some laser parameters, such as the output coupling and pump power, can be optimized, to allow optimal working condition for the laser.

It will be apparent to those skilled in the art that various modifications and variations can be made to the system and method of the present invention without departing from the spirit or scope of the invention. For example, the add/drop configurations are intended to be merely exemplary of preferred embodiments, and not exhaustive. The present invention covers the modifications and variations of this invention provided they come within the scope of the appended claims and their equivalents.

What is claimed is:

1. A double-passage acousto-optical device, comprising:
   an acousto-optical switch including first and second polarization conversion regions both coupled between first, second, third, and fourth optical ports; and
   an optical combination coupled between the second and third optical ports and including an optical isolating element.

2. The doublepassage acousto-optical device of claim 1, further comprising:
   a first optical splitter positioned between the first and fourth optical ports and the first and second polarization conversion regions, the first optical splitter having cross and bar transmission respectively for orthogonal polarization components of received light.

3. The double-passage acousto-optical device of claim 2, wherein the first optical splitter has cross transmission for TE components and bar transmission for TM components of received light.

4. The double-passage acousto-optical device of claim 2, further comprising:
   a second optical splitter positioned between the second and third optical ports and the first and second polarizaton conversion regions, the second optical splitter having cross and bar transmission respectively for orthogonal polarization components of received light.

5. The double-passage acousto-optical device of claim 4, wherein the second optical splitter has cross transmission for the TE components and bar transmission for the TM components.

6. The double-passage acousto-optical device of claim 4, further comprising a polarization controller coupled in series with the optical Isolating element.

7. The double-passage acousto-optical device of claim 4, wherein the optical combination is polarization-maintaining.

8. The double-passage acousto-optical device of claim 1, further comprising:
   an upper transducer within the acousto-optical switch acoustically coupled to the first polarization conversion region and coupled to an RF source, the upper transducer generating a first acoustic wave in the first polarization conversion region having a characteristic frequency determined by the RF source.

9. The double-passage acousto-optical device of claim 8, further comprising:
   a lower transducer within the acousto-optical switch acoustically coupled to the second polarization conversion region and coupled to the RF source, the lower transducer generating a second acoustic wave in the second polarization conversion region having the characteristic frequency with a propagation direction opposite to a propagation direction of the first acoustic wave.

10. The double-passage acousto-optical device of claim 8, wherein the first and second polarization conversion regions are positioned in sufficient proximity that the first acoustic wave travels in both the first and second polarization convers ion regions.

11. The double-passage acousto-optical device of claim 1, wherein the optical isolating element is an optical circulator having at least three ports.

12. The double-passage acousto-optical device of claim 11, further comprising:
   another acousto-optical switch coupled to the optical circulator and being constructed on a same substrate as the other acousto-optical switch.

13. A tunable laser generator using an acousto-optical device, comprising:
   an acousto-optical switch including first and second polarization converters coupled between first, second, third, and fourth optical ports;
   a first optical half-ring coupled between the first and fourth optical ports and including an optical amplifier;
   a second optical half-ring coupled between the second and third optical ports and including an optical isolating element;
   a laser output coupler positioned within one of the first and second optical half-ring.

14. The tunable laser generator of claim 13, wherein the first half-ring includes an optical isolating element.

15. The tunable laser generator of claim 14, wherein one of the first half-ring and the second half-ring consist of polarization-maintaining elements.

16. The tunable laser generator of claim 14, wherein one of the first half-ring and the second half-ring includes a polarization controller.

17. The tunable laser generator of claim 14, wherein both the first half-ring and the second half-ring include a polarization controller.

18. The tunable laser generator of claim 14, wherein the optical amplifier comprises an erbium-doped fiber optical amplifier.

19. The tunable laser generator of claim 14 further comprising an RF generator coupled to the first and second polarization converters for tuning the laser generator.

20. The tunable laser generator of claim 14, further comprising:
   a first optical splitter positioned between the first and fourth optical ports and the first and second polarization converters, the first optical splitter having cross and bar transmission respectively for orthogonal polarization components of received light.

21. The tunable laser generator of claim 20, further comprising:
   a second optical splitter positioned between the second and third optical ports and the first and second polarization converters, the second optical splitter having cross and bar transmission respectively for orthogonal polarization components of received light.

22. The tunable laser generator of claim 14, further comprising:
   an upper transducer within the acousto-optical switch acoustically coupled to the first polarization converter and coupled to an RF source, the upper transducer generating a first acoustic wave in the first polarization converter and having a characteristic frequency determined by the RF source.

23. The tunable laser generator of claim 22, further comprising:
a lower transducer within the acousto-optical switch acoustically coupled to the second polarization converter and coupled to the RF source, the lower transducer generating a second acoustic wave in the second polarization converter and having the characteristic frequency with a propagation direction opposite to a propagation direction of the first acoustic wave.

24. The tunable laser generator of claim 22, wherein the first and second polarization converters are positioned in sufficient proximity that the first acoustic wave travels in both the first and second polarization converters.

25. A method of filtering an optical frequency using an acousto-optical device, comprising the steps of:
providing at least one acousto-optical switch including first and second polarization conversion regions coupled between first, second, third, and fourth optical ports;
injecting an input optical signal having a plurality of wavelengths into the first optical port;
feeding-back an intermediate optical signal including a subset of the plurality of wavelengths from the second optical port to the third optical port via an optical isolating element; and
extracting an output optical signal including the subset of the plurality of wavelengths from the fourth optical port.

26. The method of claim 25, further comprising the step of:
extracting a remainder of the plurality of wavelengths from the second optical port via the optical isolating element, wherein the optical isolating element comprises an optical circulator having at least three ports.

27. The method of claim 25, further comprising the step of:
inputting additional wavelengths to the device via the optical isolating element, wherein the optical isolating element comprises an optical circulator having at least three ports.

28. The method of claim 25, further comprising, after the injecting step, the steps of:
splitting the input optical signal into TE and TM initial components within a first optical splitter on the switch;
passing the TE initial component to the first polarization conversion region;
passing the TM initial component to the second polarization conversion region:
orthogonally converting the TE initial component of the input optical signal having a selected frequency to a TM intermediate component in the first polarization conversion region; and
orthogonally converting the TM initial component of the input optical signal having the selected frequency to a TE intermediate component in the second polarization conversion region.

29. The method of claim 28, further comprising the step of:
combining the TE and TM intermediate components into the intermediate optical signal.

30. The method of claim 28, further comprising the step of:
combining the TE and TM initial components into the intermediate optical signal.

31. The method of claim 25, further comprising, after the feeding-back step, the steps of:
splitting the intermediate optical signal into TE and TM feedback components within a second optical splitter on the switch;
passing the TE feedback component to the first polarization conversion region;
passing the TM feedback component to the second polarization conversion region;
orthogonally converting the TE feedback component having the selected frequency to a TM final component in the first polarization conversion region; and
orthogonally converting the TM feedback component having the selected frequency to a TE final component in the second polarization conversion region.

32. The method of claim 31, further comprising the step of:
combining the TE and TM final components into the output optical signal.

33. The method of claim 31, further comprising the step of:
combining the TE and TM feedback components into the output optical signal.

34. The method of claim 25, further comprising the step of:
controlling the polarization of the intermediate optical signal.

35. The method of claim 25, further comprising the step of:
maintaining the polarization of the intermediate optical signal using polarization-maintaining components.

36. The method of claim 25, further comprising the step of:
coupling the input optical signal to the first optical port from the fourth optical port via an optical amplifier.

* * * * *